United States Patent
Heinrichs

(10) Patent No.: US 12,158,408 B2
(45) Date of Patent: Dec. 3, 2024

(54) AUTOMATED PERMEABILITY TEST FOR A FILTER BASKET

(71) Applicant: VOGELSANG GMBH & CO. KG, Essen (DE)

(72) Inventor: Martin Heinrichs, Essen (DE)

(73) Assignee: VOGELSANG GMBH & CO KG, Essen (DE)

( * ) Notice: Subject to any disclaimer, the term of this patent is extended or adjusted under 35 U.S.C. 154(b) by 281 days.

(21) Appl. No.: 17/922,989

(22) PCT Filed: May 3, 2021

(86) PCT No.: PCT/EP2021/061563
§ 371 (c)(1),
(2) Date: Nov. 3, 2022

(87) PCT Pub. No.: WO2021/224179
PCT Pub. Date: Nov. 11, 2021

(65) Prior Publication Data
US 2023/0175947 A1    Jun. 8, 2023

(30) Foreign Application Priority Data
May 6, 2020    (DE) ..................... 10 2020 112 317.5

(51) Int. Cl.
*G01N 15/08*    (2006.01)
*B01D 29/35*    (2006.01)
(Continued)

(52) U.S. Cl.
CPC ............. *G01N 15/08* (2013.01); *B01D 29/35* (2013.01); *B01D 29/60* (2013.01);
(Continued)

(58) Field of Classification Search
CPC .. G01N 15/08; G01N 15/082; G01N 15/0806; G01N 2015/084; B01D 29/35;
(Continued)

(56) References Cited

U.S. PATENT DOCUMENTS

2010/0163495 A1    7/2010    Merino et al.
2015/0306544 A1*   10/2015   Park ........................ C02F 1/001
                                                        210/636

FOREIGN PATENT DOCUMENTS

CN    110790452    2/2020
DE    19607740     9/1997
(Continued)

*Primary Examiner* — Benjamin R Schmitt
(74) *Attorney, Agent, or Firm* — PRICE HENEVELD LLP

(57) ABSTRACT

A method for automated cleaning of a filter basket in a bioreactor includes determining permeability of the filter basket. A control unit controls a suction unit for suctioning a residual liquid from the liquid tank, a liquid metering unit for dispensing a liquid having a predetermined liquid volume into the filter basket controls the suction unit to empty the liquid tank by suctioning a filtered liquid volume, measures the volume of the suctioned liquid volume, and sending a first measurement signal to the control unit. The control unit determines a permeability quotient from the volume of the extracted filtered liquid volume to the volume of the dispensed predetermined liquid volume and compares the permeability quotient with a permeability threshold. The control unit then controls a cleaning unit to perform a cleaning process of the filter basket if the permeability quotient is below the permeability threshold.

26 Claims, 15 Drawing Sheets

(51) Int. Cl.
- *B01D 29/60* (2006.01)
- *B01D 29/64* (2006.01)
- *B08B 3/02* (2006.01)
- *B08B 3/08* (2006.01)
- *B08B 13/00* (2006.01)
- *C02F 1/00* (2023.01)
- *C02F 3/02* (2023.01)
- *C02F 103/00* (2006.01)

(52) U.S. Cl.
CPC ............ *B01D 29/6438* (2013.01); *B08B 3/02* (2013.01); *B08B 3/08* (2013.01); *B08B 13/00* (2013.01); *C02F 1/001* (2013.01); *C02F 3/02* (2013.01); *G01N 15/082* (2013.01); *B01D 2201/081* (2013.01); *B01D 2201/085* (2013.01); *C02F 2103/005* (2013.01); *C02F 2209/05* (2013.01); *C02F 2209/11* (2013.01); *C02F 2209/40* (2013.01); *C02F 2303/16* (2013.01); *G01N 15/0806* (2013.01); *G01N 2015/084* (2013.01)

(58) Field of Classification Search
CPC .............. B01D 29/60; B01D 2201/081; B01D 2201/085; B01D 29/06; C02F 1/001; C02F 2209/40; C02F 2303/16; C02F 2209/003; C02F 3/006; C02F 2209/445
See application file for complete search history.

(56) References Cited

FOREIGN PATENT DOCUMENTS

| | | |
|---|---|---|
| DE | 202013102318 | 7/2013 |
| KR | 20110001354 | 1/2011 |

\* cited by examiner

AUTOMATED PERMEABILITY TEST FOR A FILTER BASKET

CROSS-REFERENCE TO FOREIGN PRIORITY APPLICATION

The present application claims the benefit under 35 U.S.C. §§ 119(b), 119(e), 120, and/or 365(c) of PCT/EP2021/061563 filed May 3, 2021, which claims priority to German Application No. 10 2020 112 317.5 filed May 6, 2020.

FIELD OF THE INVENTION

The invention relates to a method and a device for automated cleaning of a filter basket in a solids tank of a bioreactor, which can be used in particular for reprocessing wastewater from sanitary and toilet systems, including biological toilets, according to the principle of a biological wastewater treatment plant.

BACKGROUND OF THE INVENTION

Conventional bioreactors have a solids tank with a filter basket into which wastewater with solid and liquid components is fed. The filter basket separates the solid from the liquid components. For this purpose, the filter basket has filter elements on the walls, such as the bottom and side walls, through which liquid elements can flow off and through which solid elements are collected. The solid elements collect at the bottom inside the filter basket separated from the liquid elements and form a filter cake. The liquid elements flow through the filter elements into the solids tank and from there into a liquid tank, which is in fluid communication with the solids tank.

It is known that the solid elements in the filter basket settle as a filter cake. First, a filter cake is formed starting at a bottom side of the filter basket and then at the sides of the filter basket. As a result, the water is inhibited, by the filter cake, from flowing into the solids tank. A filter cake with some permeability will result in an efficient filtration process. However, an increasingly thick and impermeable filter cake can cause the filter basket to clog. This leads to an inefficient filtering process, as the liquid hardly passes through the filter anymore. It is, therefore, necessary to remove solids from the filter basket at regular intervals to ensure adequate drainage of the water into the solids tank.

It is known to remove the filter cake to counteract this clogging. Often, the filter cake is removed as soon as the first effects of clogging appear. However, this has the disadvantage that inefficient filtration has already taken place. It is also known to check the amount of filter cake from time to time to determine if removal is necessary. However, this has the disadvantage that the check is carried out randomly, and at the correct time, i.e., neither too early nor too late, for removal of the filter cake cannot be reliably determined in this way. In addition, it is not possible to reliably assess whether the filter cake already has level of impermeability that it must be removed.

One problem with such cleaning processes, however, is that bioreactor plants are usually constructed as closed systems and it is, therefore, very difficult to determine the degree of contamination and the cause of insufficient filtration. Existing bioreactors in particular often do not have interfaces that can be used to read out the information required to determine the cause of a fault or the degree of contamination, or even data that is helpful for this purpose.

This is particularly difficult if such a bioreactor is installed on board a vehicle, such as a track-bound wagon, in order to clean the dirty water that accumulates there. In such applications, maintenance and assurance of the bioreactor's function is often desired decentrally and without its removal, but at the same time, due to the necessary compactness, access to the bioreactor and to data describing its condition is not possible or only possible at great expense.

It is, therefore, an object of the invention to provide a method and apparatus that allow bioreactors to maintain operability in a better and simpler manner, even without access to internal data and information of the bioreactor.

SUMMARY OF THE INVENTION

This problem is solved by a method for automated cleaning of a filter basket in a bioreactor, wherein the filter basket on the outlet side is in fluid communication with a liquid tank, and wherein the filter basket is defined on the bottom side and lateral sides by filtering walls. The method comprises a step of determining a permeability of the filter basket. This step comprises controlling a suction unit by means of an electronic control unit to suction a residual liquid from the liquid tank through a drain line, then controlling a liquid metering unit by means of the electronic control unit to dispense a liquid having a predetermined liquid volume into the filter basket through a flush line, and stopping the dispensing of the liquid at a filter starting time. Further, determining the permeability comprises controlling, after a duration of a predetermined filter time interval beginning at the filter start time, the suction unit by means of the control unit to empty the liquid tank by suctioning a filtered liquid volume from the liquid tank through the drain line, measuring the volume of the filtered liquid volume of the filtered liquid suctioned in the previous step in a measuring unit, and sending a first measurement signal representing a first measurement result from the measuring unit to the control unit. The control unit then forms a first permeability quotient from the volume of the extracted filtered liquid volume to the volume of the predetermined liquid volume initially dispensed, and compares the first permeability quotient to a first predetermined permeability threshold. If the permeability quotient is below the first permeability threshold, a cleaning unit for carrying out a cleaning process of the filter basket is activated, preferably by means of the control unit.

This method is based on the finding of the inventors that the efficiency of the filtering process can be increased by determining the permeability of the filter basket by means of the permeability, in particular, of the bottom side of the filter basket in an automated process. This makes it possible to carry out a cleaning process as a function of a ratio of a permeability quotient to a permeability threshold. In this way, it can be avoided that only insufficient cleaning is carried out and that a filter cake builds up again too quickly. In practice, the process should be able to follow an initial, e.g., regular, cleaning and thus check the success of the initial cleaning. If, for example, it is determined that the first cleaning preceding the determination of permeability was already sufficient, the cleaning unit is not activated to carry out the cleaning process.

By using such a method, the permeability of the filter basket can be determined quickly and reliably and, if necessary, the filter basket can then be cleaned as required. In particular, such a method provides for a considerably reduced effort with reduced personnel requirements. Furthermore, the accuracy of the determination of the permeability of the filter basket can be considerably improved by excluding human sources of error.

In an embodiment, the process is carried out with a mobile or stationary permeability test device that can be connected to corresponding ports of the bioreactor. The permeability test device is preferably part of a bioreactor cleaning system, which can also be mobile or stationary.

A mobile bioreactor cleaning system is preferably arranged on a service cart that travels to bioreactors for cleaning. A practical example is a train station where several trains arrive that have bioreactors. The service cart can then move from train to train to clean the respective bioreactors. Stationary bioreactor cleaning systems, on the other hand, are stationary, for example, installed in a service station. Such stationary bioreactor cleaning systems may be set up at stations or service points. Usually, such stationary bioreactor cleaning systems are capable of cleaning a plurality of bioreactors simultaneously.

In other embodiments, however, the permeability test device can also be permanently installed, preferably adjacent to the bioreactor, and permanently connected to the bioreactor, particularly in the case of larger bioreactors. Both variants have their advantages, depending on further general conditions.

The permeability test device preferably comprises the control unit, the suction unit, the liquid metering unit and the measuring unit, but these do not necessarily have to be assigned exclusively to the permeability test device. Single elements can also be partially assigned to other units within a bioreactor cleaning system.

The cleaning unit, which is also part of the bioreactor cleaning system and can be partially or completely associated with the permeability test device, preferably uses a nozzle or the like that is permanently installed in the bioreactor in order to be able to mechanically clean the filter basket on the one hand, and on the other hand also to allow a supply of chemical substances, such as acid, in order to be able to chemically clean off contamination or calcification. For example, the cleaning unit has a high pressure outlet that can be connected to a port of the nozzle to supply a cleaning liquid (water or a chemically active substance) under pressure to the nozzle. The nozzle is preferably a full jet nozzle, preferably a rotating one, in order to be able to mill off contamination of the filter basket. The cleaning unit preferably has a high-pressure source in order to be able to supply the cleaning liquid to the nozzle at high pressure. The cleaning unit is not necessarily connected to the control unit. It is also sufficient if the control unit provides the result of the comparison of the first permeability quotient with the predetermined permeability threshold and then, for example, another cleaning control unit controls the cleaning unit or also an operator reads the result of the comparison, for example, from a display, and controls the cleaning unit accordingly, for example, by operating a tap, in order to supply the cleaning liquid to the nozzle at high pressure. Preferably, however, the control unit controls the cleaning unit, as this allows a higher degree of automation to be achieved. The cleaning process can then be automated depending on the comparison.

The control unit is in electronic signal connection with the suction unit, the liquid metering unit, the measuring unit, and preferably the cleaning unit. The control unit is adapted to control the respective units using electronic signals and to exchange data in both directions with the respective units. Examples of such a control unit may be a micro-controller, a computer or a tablet. The control unit is preferably a central control unit of a bioreactor cleaning system and is adapted to control the bioreactor cleaning system.

The first permeability threshold is preferably pre-stored in the control unit. It can be based on empirical values or specified by an operator. It can also be predefined at the factory, or selected depending on the bioreactor and in particular on the design of the filter basket.

A liquid metering unit can, for example, comprise a measuring cylinder with electronically controllable valves, via which a liquid can be fed into the solids tank by means of pressure via a fluid connection, such as hoses or pipes. A measuring unit can, for example, comprise an electronically controllable measuring cylinder that is designed to measure a fill level of a liquid in the measuring cylinder. For this purpose, for example, a corresponding level sensor may be provided in the measuring cylinder. A suction unit may, for example, comprise a pipe or hose system under negative pressure with electronically controllable valves, which is in direct fluid connection with the discharge line. Furthermore, the pipe and hose system of the suction unit may be in fluid communication with the drain line via the measuring unit. For example, a negative pressure may be generated by a pump system that is in fluid communication with the suction unit. Preferably, the suction unit can be selectively coupled to the drain line on an as-needed basis, for example, via a Kamlok coupling.

Even though the suction unit, the liquid metering unit, and the measuring unit are referred to as different units, it is not necessary that they form separate structural units. Rather, it is preferred that they be integrated into a permeability testing device and/or bioreactor cleaning device and partially comprise and share common components. For example, a pump may be provided that may be part of both the suction unit and the liquid metering unit. The terms suction unit, liquid metering unit, measuring unit, and cleaning unit are, therefore, to be understood functionally.

According to a preferred embodiment, the method is characterized in that after completion of the (first) cleaning process, a second determination of a permeability of the filter basket is carried out. This is to check whether the filter basket is now sufficiently cleaned. This second determination of the permeability is preferably performed similarly or identically to the previous (first) determination of the permeability. It preferably comprises a step of driving the suction unit by means of the electronic control unit to suck a residual liquid from the liquid tank through the drain line, driving the liquid metering unit by means of the electronic control unit to dispense a liquid having a predetermined liquid volume into the filter basket through the flush line, and stopping the dispensing of the liquid at a filter start time. Further, the second determination of permeability comprises driving, after a duration of a predetermined filter time interval starting from the filter start time, the suction unit by means of the control unit to empty the liquid tank by suctioning a filtered liquid volume from the liquid tank through the drain line, measuring the volume of the filtered liquid volume of the filtered liquid extracted in the previous step in a measuring unit, and sending a second measurement signal representing a second measurement result from the measuring unit to the control unit. The control unit then forms a second permeability quotient from the volume of the filtered liquid volume extracted in the previous step to the volume of the predetermined liquid volume output at the beginning of the second determination of permeability, and compares this second permeability quotient to a second predetermined permeability threshold, the second permeability threshold preferably being equal to or greater than the first predetermined permeability threshold. The method preferably further comprises controlling the cleaning unit preferably by means of the control unit to perform a cleaning process of the filter basket, if the previously formed second permeability quotient falls below the second permeability threshold.

According to a further preferred embodiment, the cleaning unit is caused to perform a mechanical cleaning process if the first permeability quotient falls below a first cleaning threshold that is lower than the first permeability threshold. Preferably, the cleaning unit is caused to perform a chemical cleaning process if the first permeability quotient exceeds the first cleaning threshold but is lower than the first permeability threshold. Preferably, the causing of the cleaning unit is performed by means of the control unit. A mechanical cleaning process preferably comprises introducing the cleaning liquid, which in this case may be water, under high pressure. This can mill off a filter cake that has formed at the bottom of the filter basket. A chemical cleaning process preferably comprises introducing a chemical substance, preferably acid. This is preferably not carried out with high pressure, but with only low pressure. In addition, an exposure time is provided in the chemical cleaning process to allow any chemical processes to take place.

According to this embodiment, the most effective cleaning process can be used to clean the filter basket. A mechanical cleaning process relieves the filter basket primarily from coarse impurities, such as the filter cake. A chemical cleaning process relieves the filter basket primarily from finer impurities, such as calcification. If the permeability is very low, it can be assumed that the filter basket is coarsely contaminated, whereas mechanical cleaning is more effective. If the permeability is less low, chemical cleaning is more effective, for example, to remove calcification from the filter plates.

According to a further preferred embodiment, the cleaning unit is caused to perform a mechanical second cleaning process if the second permeability quotient falls below a second cleaning threshold that is lower than the second permeability threshold and higher than the first cleaning threshold. Preferably, the cleaning unit is caused to perform a chemical second cleaning process if the second permeability quotient exceeds the second cleaning threshold but is less than the second permeability threshold. Preferably, causing of the cleaning unit is carried out by means of the control unit.

According to this embodiment, the most effective cleaning method, mechanical or chemical, is applied for the second cleaning process of the filter basket. As previously described, this allows the optimal cleaning method to be applied for one type of contamination.

It should be understood that third, fourth, and further cleaning processes can also follow the second cleaning process. These then preferably have the same process steps as the second cleaning process, with the provision that in each case further values and quotients are determined and used.

It is also preferred to provide and use additional sensors. For example, the flow test device has a turbidity sensor and/or a conductivity sensor. Preferably, these are arranged downstream of or in the drain line to measure the suctioned liquid. Such sensors are preferably connected to the control unit to provide corresponding signals thereto. Preferably, the turbidity sensor provides a turbidity signal representing turbidity of the fluid. Preferably, the conductivity sensor provides a conductivity signal representing a conductivity of the fluid. A high turbidity is an indication of a high loading of suspended solids in the fluid, and thus an indication of a high level of contamination. For example, high turbidity also occurs after a mechanical cleaning process, so that rinsing of the bioreactor is then preferably carried out until a desired turbidity is achieved. Similarly, a higher conductivity indicates that the liquid is loaded with ion-forming material.

According to another preferred embodiment, the dispensed predetermined volume of liquid is sized according to the product of an area of the bottom side of the filter basket and a fill height of 0.25 cm to 2.5 cm, preferably 0.25 cm to 1.0 cm, more preferably 0.5 cm in the filter basket. This is based on the knowledge of the inventors that, due to gravity, the bottom side of the filter basket is the most contaminated and the permeability of the bottom side of the filter basket can be assumed to be representative of the permeability of the filter basket. Therefore, it is advantageous if the thinnest possible film of the dispensed liquid, such as with a fill level of 0.5 cm, spreads over the bottom side of the filter basket, since this prevents the dispensed liquid from flowing over the side walls and does not falsify the determination of the permeability of the filter basket. The filling height can also assume any value below about 1 cm, such as 0.1, 0.2, 0.3, 0.4, 0.6, 0.7, 0.8, 0.9, 1 cm. In addition, this allows the duration of the permeability test to be reduced.

In a preferred further development, the liquid metering unit is controlled by means of the electronic control unit in such a way that the dispensing of the liquid with the predetermined liquid volume takes place at a dispensing rate of 5 liters per minute or less, preferably 2.5 liters per minute or less. The dispense rate should be adapted to the total volume of the filter basket and, in particular, to the footprint of the bottom of the filter basket. Preferably, the discharge rate is selected so that the added liquid flows through the bottom of the filter basket and not through the side walls. In particular, no water surge should be input that could falsify the measurement result.

Preferably, in the second determination of permeability, the liquid metering unit is controlled by means of the electronic control unit in such a way that the dispensing of the liquid with the predetermined liquid volume takes place at a dispensing rate which does not exceed the quotient of the volume measured in the first determination of permeability to the predetermined filter time interval according to the first determination of permeability. Units are to be ignored here.

Furthermore, preferably before the respective steps in which the liquid metering unit is controlled by means of the electronic control unit to dispense a liquid with a predetermined liquid volume into the filter basket, the respective flushing line is first completely filled with liquid. The reason for this is that the flushing line can have different lengths depending on the embodiment. For example, if the bioreactor is housed in a train, the length of the flushing line may vary depending on the installation position. Once the feed line is completely filled, air bubbles form at upper saddle points or the water always flows off where there is a slope. If an additional volume is now added to the completely filled flushing line, exactly this volume is also discharged into the filter basket. This ensures that a large part of the liquid does not simply "disappear" into the hose system without being dispensed into the filter basket.

Furthermore, in a preferred embodiment, it is provided that the control unit controls the suction unit at the beginning of the determination of the permeability of the filter basket for the duration of a predetermined first suction period. Preferably, the control unit also controls the suction unit in step (d) likewise for the duration of the predetermined first suction period. Step (d) refers here to controlling, after a duration of a predetermined filtering time interval has elapsed, the suction unit to empty the liquid tank by suctioning a filtered liquid volume from the liquid tank. The inventors have found that a lens of water of the level formed in the filter basket has a great influence on a measurement result when the tank is relatively empty. This is due to the large area of the water level. The larger the base area of the bioreactor or the filter basket, the greater the influence here. If supposedly only air is suctioned in, the water level is reduced by additionally sucking off the lens of water, because the water level is changed by a few millimeters due to the air suction and thus additional liquid is sucked off. This can have a considerable influence on the measurement result. For this reason, suction is preferably always applied at a constant duration, irrespective of the volume actually aspirated.

Alternatively or additionally, it can also be provided that during suction in all or some of the steps in which suction is performed from the liquid tank, it is monitored by means of a suction detection unit whether liquid or air is being sucked in. Preferably, the suction detection unit comprises a suction sensor, which may be designed, for example, as a capacitive sensor. Via such a capacitive sensor, the capacitance of air-liquid mixture present in the discharge line can be detected. The suction sensor then preferably provides a suction signal to the electronic control unit, which represents the air-liquid ratio. The greater the air-to-liquid ratio, the lower a dielectric constant of the air-to-liquid mixture in the drain line. This can be detected by means of the capacitive sensor. Thus, by such a suction detection unit, it can be detected whether the liquid tank is actually empty or needs to be further suctioned. If the suction signal falls below a predetermined suction threshold, which is, for example, a dielectric constant, suction is preferably still continued for a predetermined time interval. This time interval is preferably about 1 second to 10 seconds, preferably about 2 seconds. In this way, it can be achieved that suction is only continued for as long as is necessary to remove the residual liquid or the filtered liquid volume from the liquid tank and to empty it completely. The suction sensor can also be a density sensor or flow sensor as an alternative or in addition to the capacitive sensor.

Preferably, the liquid metering unit has a measuring cylinder and the method comprises the step of: receiving the predetermined volume of liquid into the measuring cylinder. This step is performed before the predetermined volume of liquid is dispensed into the filter basket. In this way, the volume of liquid can be measured easily and accurately. The measuring cylinder is preferably used to separate the air from the liquid in the aspirated air-liquid mixture. During suction, such a mixture is usually sucked in over the largest period of time, so that a simple flow meter is not sufficient to determine the volume of liquid.

The method preferably comprises the step of: receiving the extracted filtered liquid volume in the measuring cylinder, prior to measuring the volume of the extracted filtered liquid volume. The measuring cylinder can thus be used for two purposes, namely for measuring the predetermined volume of liquid and also for measuring the extracted filtered liquid volume.

To collect the extracted filtered liquid volume, a vacuum is preferably applied to the measuring cylinder in order to extract the filtered liquid volume and thus collect it in the measuring cylinder. For this purpose, a vacuum connection is preferably provided on the measuring cylinder.

Furthermore, the measuring cylinder preferably comprises a non-contact distance sensor for detecting a filling level in the measuring cylinder. Preferably, the measurement of the volume of the suctioned filtered liquid volume is then performed by means of the non-contact distance sensor. The distance sensor can be designed, for example, as an ultrasonic sensor, laser or LiDAR sensor, radar sensor, or the like.

Furthermore, the above-mentioned task is solved in a second aspect by a permeability test device for automated cleaning of a filter basket in a bioreactor. Again, the permeability test device is preferably part of a bioreactor cleaning system, which is connected to the bioreactor for cleaning the latter. The filter basket of the bioreactor is in fluid communication with a liquid tank on the outlet side and is defined on the bottom side and lateral sides by filtering walls. In accordance with this aspect of the invention, the permeability test device comprises an electronic control unit which is or can be brought into signal connection with an extraction unit, a liquid metering unit and a measuring unit, and also is or can be brought into signal connection with a cleaning unit, wherein the suction unit is in fluid connection with the measuring unit. Again, it applies that the mentioned elements do not necessarily have to be exclusively associated with the permeability test device, but rather can be part of the bioreactor cleaning unit. In particular, the control unit is preferably a central control unit bioreactor cleaning system. The control unit is adapted to control the suction unit, the liquid metering unit and the measuring unit for determining a permeability of the filter basket. More specifically, the control unit is adapted to drive the suction unit to suction a residual liquid from the liquid tank through a drain line, then control the liquid metering unit to dispense a liquid having a predetermined liquid volume into the filter basket through a flushing line, and stop dispensing the liquid at a filter start timing. The control unit is further adapted to control, after a duration of a predetermined filtering time interval starting from the filtering start timing has elapsed, the suction unit to empty the liquid tank by suctioning a filtered liquid volume from the liquid tank through the drain line, measure the volume of the filtered liquid volume suctioned in the previous step of the filtered liquid in a measurement unit, and receive a first measurement signal representing a first measurement result from the measurement unit. The control unit is then further adapted to form a first permeability quotient from the volume of the filtered liquid volume extracted in the previous step to the volume of the predetermined liquid volume dispensed at the beginning of the method in the control unit, and to compare the first permeability quotient with a first predetermined permeability threshold.

The control unit is preferably also adapted to control the cleaning unit for cleaning the filter basket if the first permeability quotient formed in the previous step falls below the first permeability threshold. For the last step, it is necessary that the control unit is in signal connection with the cleaning unit.

Again, the cleaning that may then be carried out after determining the permeability is usually already the second cleaning in practice. In practice, an operator will connect the bioreactor cleaning system including the permeability test device to the bioreactor and first perform a cleaning manually. Afterwards, the permeability test device is used to determine the permeability of the filter basket and then, if necessary, a further cleaning is carried out.

It is further to be understood that the method according to the first aspect of the invention and the permeability test device according to the second aspect of the invention, have the same and similar sub-aspects as set forth, in particular, in the dependent claims. In this respect, reference is made in full to the above description of the first aspect of the invention for particular embodiments, further developments and advantages thereof.

Preferably, the permeability test device has a drain line connection for connecting the permeability test device to the drain line and a flush connection for connecting the permeability test device to the flush line. Corresponding Kamlok coupling parts may be provided for this purpose. It is also preferred that the flow test device is permanently connected to the drain line and the flush line, for example via multi-way valves.

Furthermore, the permeability test device preferably has a fresh water connection for supplying fresh water to the permeability test device and a compressed air connection for supplying compressed air to the permeability test device.

According to another preferred embodiment, the drain pipe is arranged on a side of the solids tank.

According to another preferred embodiment, the drain pipe opens into the solids tank with a drain pipe opening, and the lower edge of the drain pipe opening is arranged at a distance from an inner surface of the bottom wall of the solids tank.

In a further preferred embodiment of the permeability test device, the control unit is adapted to control the suction unit, the liquid metering unit and the measuring unit for a second determination of a permeability of the filter basket after completion of the cleaning process. For this purpose, it carries out the steps: Controlling the suction unit to suction a residual liquid from the liquid tank through the drain line, driving the liquid metering unit to dispense a liquid having a predetermined liquid volume into the filter basket through the flush line, and stopping the dispensing of the liquid at a filter start timing. Subsequently, it performs the steps of: Controlling, after a duration of a predetermined filtering time interval starting from the filtering start timing has elapsed, the suction unit by means of the control unit to empty the liquid tank by suctioning a filtered liquid volume from the liquid tank through the drain line, measuring the volume of the filtered liquid volume suctioned in the previous step of the filtered liquid in a measurement unit, and receiving a second measurement signal representing a second measurement result from the measurement unit in the control unit. The control unit is further adapted to form a second permeability quotient from the volume of the suctioned filtered liquid volume to the volume of the dispensed predetermined liquid volume, and to compare the formed second permeability quotient to a second predetermined permeability threshold, the second permeability threshold preferably being equal to or greater than the first predetermined permeability threshold. The control unit is further adapted, after the second determination of a permeability of the filter basket, to control the cleaning unit to perform a second cleaning process of the filter basket if the permeability quotient is below the second predetermined permeability threshold.

According to a further preferred embodiment, the control unit is configured to control the cleaning unit to perform a mechanical cleaning process after determining the permeability of the filter basket if the first permeability quotient is below a first cleaning threshold that is lower than the permeability threshold. The control unit is preferably adapted to control the cleaning unit to perform a chemical cleaning process when the first permeability quotient exceeds the first cleaning threshold but is lower than the first permeability threshold.

According to a further preferred embodiment, the control unit is adapted to control the cleaning unit to perform a mechanical second cleaning process after the second determination of a permeability of the filter basket, if the second permeability quotient is below a second cleaning threshold, which is lower than the second permeability threshold and is higher than the first cleaning threshold. The control unit is preferably further adapted to control the cleaning unit to perform a chemical second cleaning process when the second permeability quotient exceeds the second cleaning threshold but is lower than the second permeability threshold.

The permeability test device preferably has a turbidity sensor and/or a conductivity sensor downstream of the dr line, which is connected to the control unit for providing to the control unit a turbidity signal representing a turbidity of the extracted liquid and/or a conductivity signal representing a conductivity of the extracted liquid. This may provide additional information about the purification state of the bioreactor. This additional information can be used to determine whether a further cleaning process is necessary, and, if so, whether this should be carried out mechanically and/or chemically.

In a preferred further development, the liquid metering unit of the permeability test device has a measuring cylinder in which the predetermined volume of liquid is accommodated. The measuring cylinder is preferably at least partially made of transparent material or has a window so that an operator can also visually check the liquid present therein. The measuring cylinder is preferably designed and connected in such a way that the extracted filtered liquid volume can be accommodated in the measuring cylinder, also. This can be achieved, for example, by connecting the measuring cylinder to the suction unit in order to apply a vacuum to it.

Advantageously, the measuring cylinder has a non-contact distance sensor for detecting a fill level in the measuring cylinder. The non-contact distance sensor is preferably connected to the control unit in order to provide it with a level signal representing the level in the measuring cylinder.

Embodiments of the invention are in the following described with reference to the drawings. These are not necessarily intended to show the embodiments to scale; rather, where useful for explanation, the drawings are in schematized and/or slightly distorted form. With regard to additions to the gauges directly recognizable from the drawings, reference is made to the relevant prior art. It should be borne in mind that a wide variety of modifications and changes concerning the shape and detail of an embodiment can be made without departing from the general idea of the invention. The features of the invention disclosed in the description, in the drawings as well as in the claims may be essential for the further development of the invention both individually and in any combination. In addition, all combinations of at least two of the features disclosed in the description, the drawings and/or the claims fall within the scope of the invention. The general idea of the invention is not limited to the exact form or detail of the preferred embodiments shown and described below, or limited to any subject matter that would be limited as compared to the subject matter claimed in the claims. In the case of stated design ranges, values lying within the stated limits are also intended to be disclosed as limiting values and to be capable of being used and claimed as desired. For simplicity, identical reference signs are used below for identical or similar parts or parts with identical or similar function.

BRIEF DESCRIPTION OF THE DRAWINGS

Further advantages, features and details of the invention will be apparent from the following description of preferred embodiments and from the drawings. The drawings show in.

DETAILED DESCRIPTION OF THE EMBODIMENTS

Figure 1:
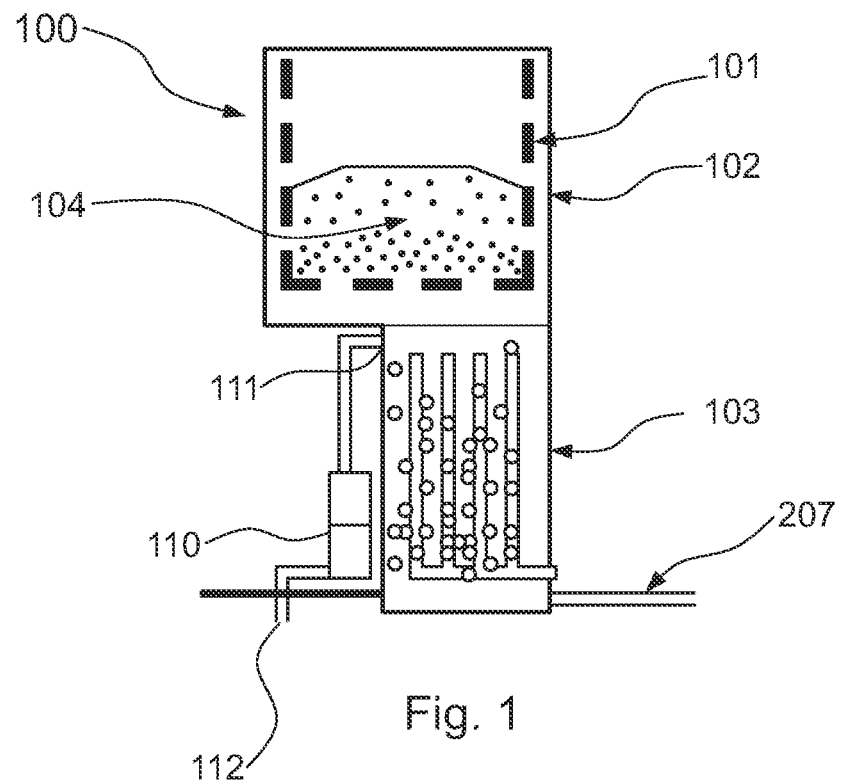
FIG. 1 is a schematic cross-sectional view of a bioreactor in a first embodiment.

FIG. 1 shows a schematic representation of a bioreactor 100 in a first embodiment in cross section. Such a bioreactor can, for example, be installed in passenger trains in order to purify wastewater from toilets and wash basins while the train is still in motion, and preferably also to discharge the purified water while the train is in motion. In this way, cleaning and emptying cycles of collection tanks on board the passenger train can be significantly extended.

Bioreactor 100 includes a solids tank 102 for receiving wastewater containing liquid and solid components. A filter basket 101 is located within the solids tank 102. The filter basket 101 is formed by filtering walls 201, 202 (see FIG. 3) that allow liquid components to pass through and retain solid components. The filter basket 101 separates the solid components from the liquid components by retaining the solid components inside. The liquid components flow out of the filter basket 101 and are gravity-driven from there into the liquid tank 103, which in this embodiment is formed as a liquid reactor for clarification by bacteria. An opening is provided between the solids tank 102 and the liquid tank 103 so that the liquid can pass over unhindered. The solid components form a solid filter cake 104 at the bottom of the filter basket 101. In the area of a bottom 105 of the liquid tank 103, a drain line 207 is provided, which will be described in more detail below. Further, a sanitizer 110 is provided on the bioreactor 100 and is connected to the liquid tank 103 via an overflow 111. Liquid that has been biologically purified by bacteria in the liquid tank 103 can thus enter the hygienizer 110 via the overflow 111 and be discharged from the hygienizer 110 to the environment via a drain 112.

Figure 2:
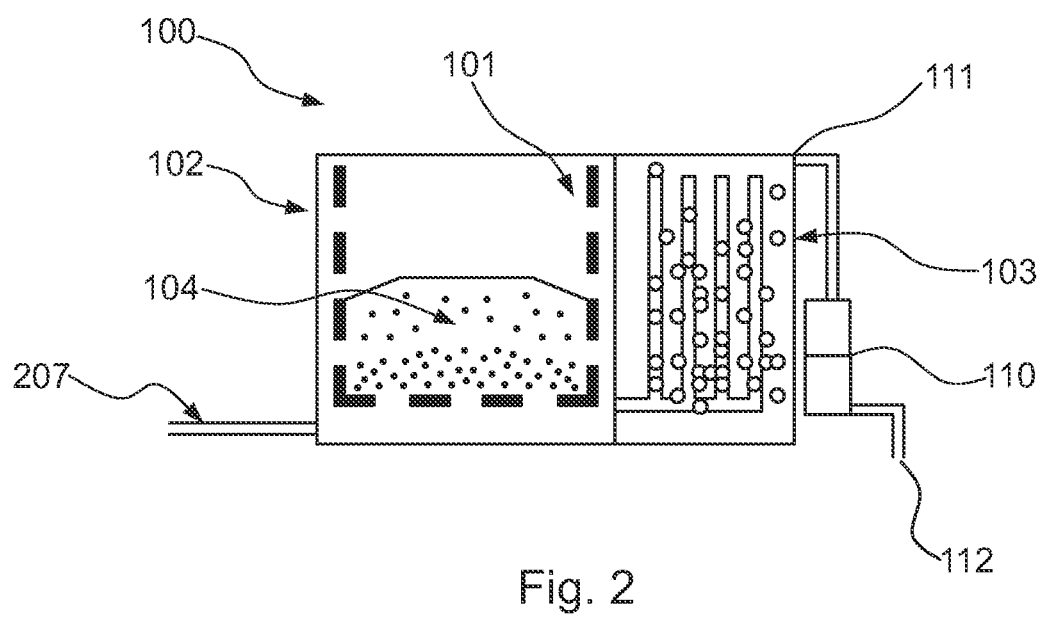
FIG. 2 is a schematic cross-sectional view of a bioreactor in a second embodiment.

FIG. 2 shows a second embodiment of the bioreactor 100, which differs from the embodiment in FIG. 1 in that the liquid tank 103 is arranged next to the solids tank 102. Such embodiment is particularly suitable for underbody installation in rail-bound vehicles. In FIG. 2, moreover, the outlet line 207 is arranged at the side of the solids tank 102, in the vicinity of the floor.

Figure 3:
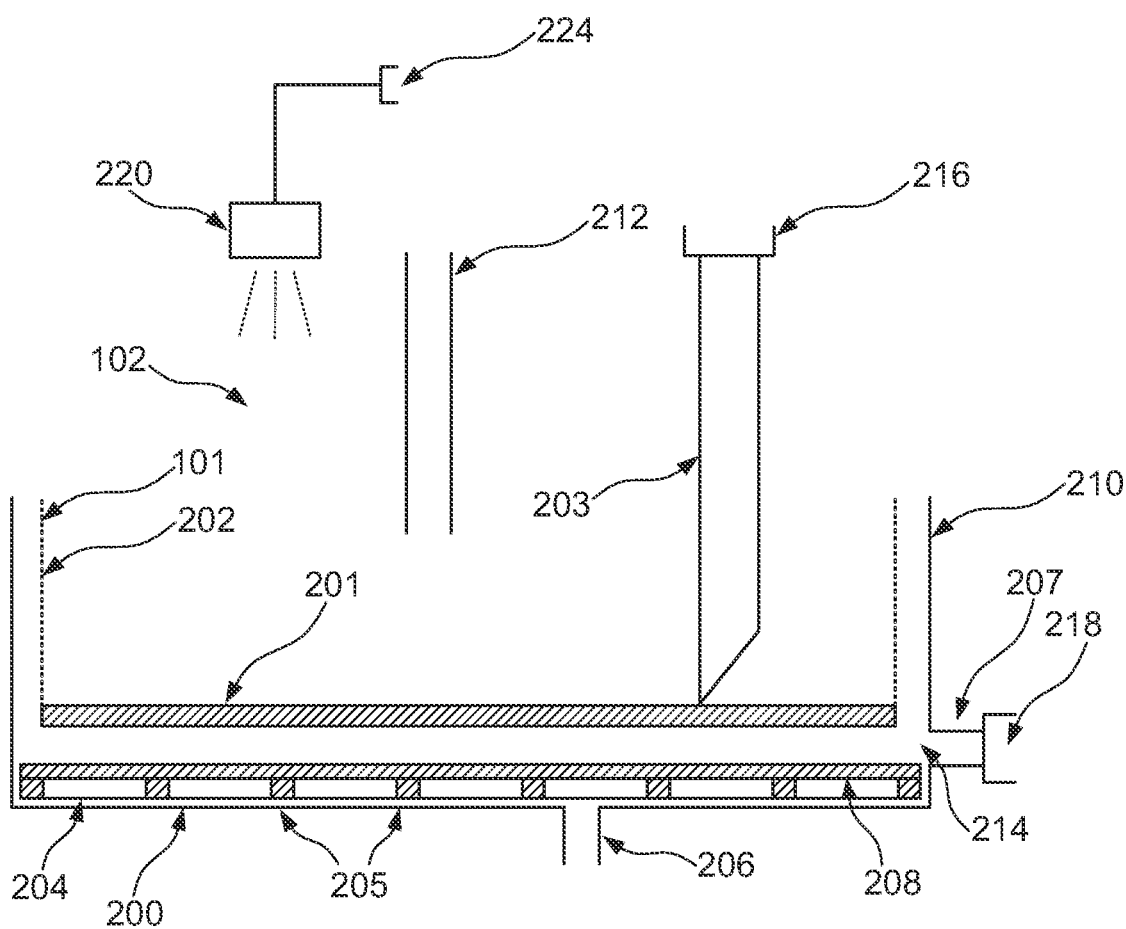
FIG. 3 is a schematic section of a solids tank of the bioreactor in cross-section.

FIG. 3 shows a schematic cross-sectional view of a solids tank 102 of the bioreactor 100 of FIG. 2. The solids tank 102 is has a bottom 200 and side walls 210, and may be fed with wastewater through an inlet 212 that projects vertically from the top into a filter basket 101 inside the solids tank 102, for example.

The filter basket 101 serves to separate liquid and solid components of the wastewater supplied via the inlet 212. A filter basket 101 is typically defined on the sides by filter plates that allow liquid constituents to pass through and retain solid constituents. Filter elements may be, for example, sintered plates and/or perforated plates. In one embodiment, the filter basket 101 is defined at a bottom by a sintered plate 201 and at the surrounding sides by perforated plates 202. The perforated plates 202 may, for example, have a spacing of holes of about 1 mm. The shape of the bottom plate can be any shape, for example circular or rectangular.

In the embodiment shown in FIG. 2, the bottom 200 of the solids tank 102 is supported by horizontally extending square tubes 205. A freeze drain 206 is disposed in the bottom 200 of the solids tank 102, through which liquid and solid components within the solids tank 200 can be drained. This freeze drain 206 is usually difficult to access from the outside. Further, the drain pipe 207 is located on a side wall 210 of the solids tank 102. The drain pipe 207 is arranged on the side wall of the solids tank 102 such that a lower edge of an orifice 214 with which the drain pipe 207 opens into the solids tank 102 is spaced from the bottom 200 of the solids tank 102. A residual liquid 208 containing solid and liquid components can thus collect below the lower edge of the mouth opening. This may prevent solid components from entering the drain pipe 207. For example, a drain pipe 207 may be a pre-installed pipe that opens into, among other things, the liquid tank 103.

Furthermore, a flush connection, which here functions as a flushing line 203, opens into the filter basket 101. Both the inlet 212 and the flushing line 203 are permanently installed. However, the flushing line 203 is not used during normal operation of the bioreactor 100. Rather, wastewater is supplied exclusively through the inlet 212. Both lines, the flushing line 203 and the drain line 207, are closed during normal operation of the bioreactor 100. The method for automated cleaning of the filter basket 101 now exclusively uses the flushing line 203 as well as the drain line 207 to test the permeability of the filter basket 101, in particular, the permeability of the sinter plate 201. In this way, already installed lines can be used without the need to add additional lines, inlets, or outlets to the bioreactor 100. Known manual methods, on the other hand, use the freeze drain 206, which requires a not inconsiderable amount of work due to the location of the latter.

Both lines, the drain line 207 and the flushing line 203, are provided here with a coupling 216, 218 which closes the lines and which are designed here as Kamlok couplings. Both lines also serve to clean the bioreactor 100 during manual operation.

Furthermore, a cleaning nozzle 220 is provided in the bioreactor 100, which is also permanently mounted. The cleaning nozzle is connected to a high-pressure port 224 so that, for example, water under high pressure can be supplied to it. However, acids or alkali for chemical cleaning can also be supplied via the high-pressure port 224. In the event that the bioreactor 100 is installed, for example, in a rail-bound vehicle, the couplings 216, 218 as well as the high-pressure port 224 are accessible from outside the vehicle.

Figure 4A:
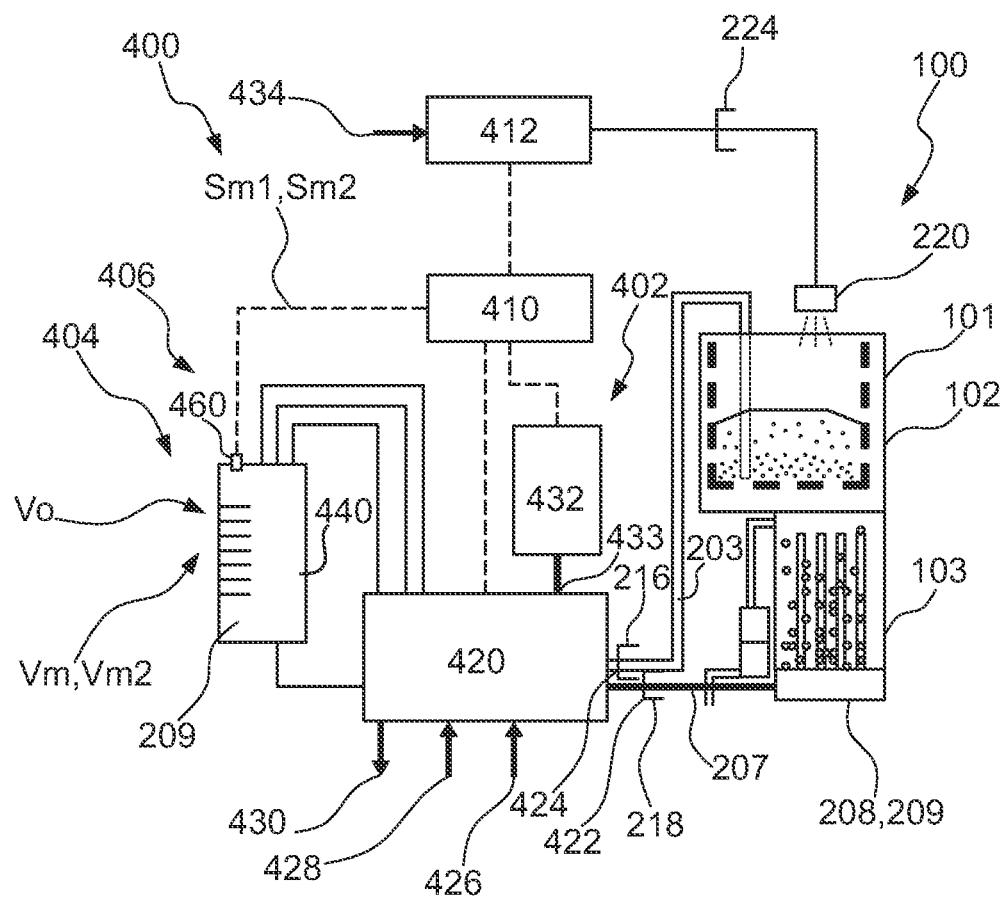
FIG. 4a is a schematic view of a permeability test device according to a first embodiment, which is connected to a bioreactor.
Figure 4B:
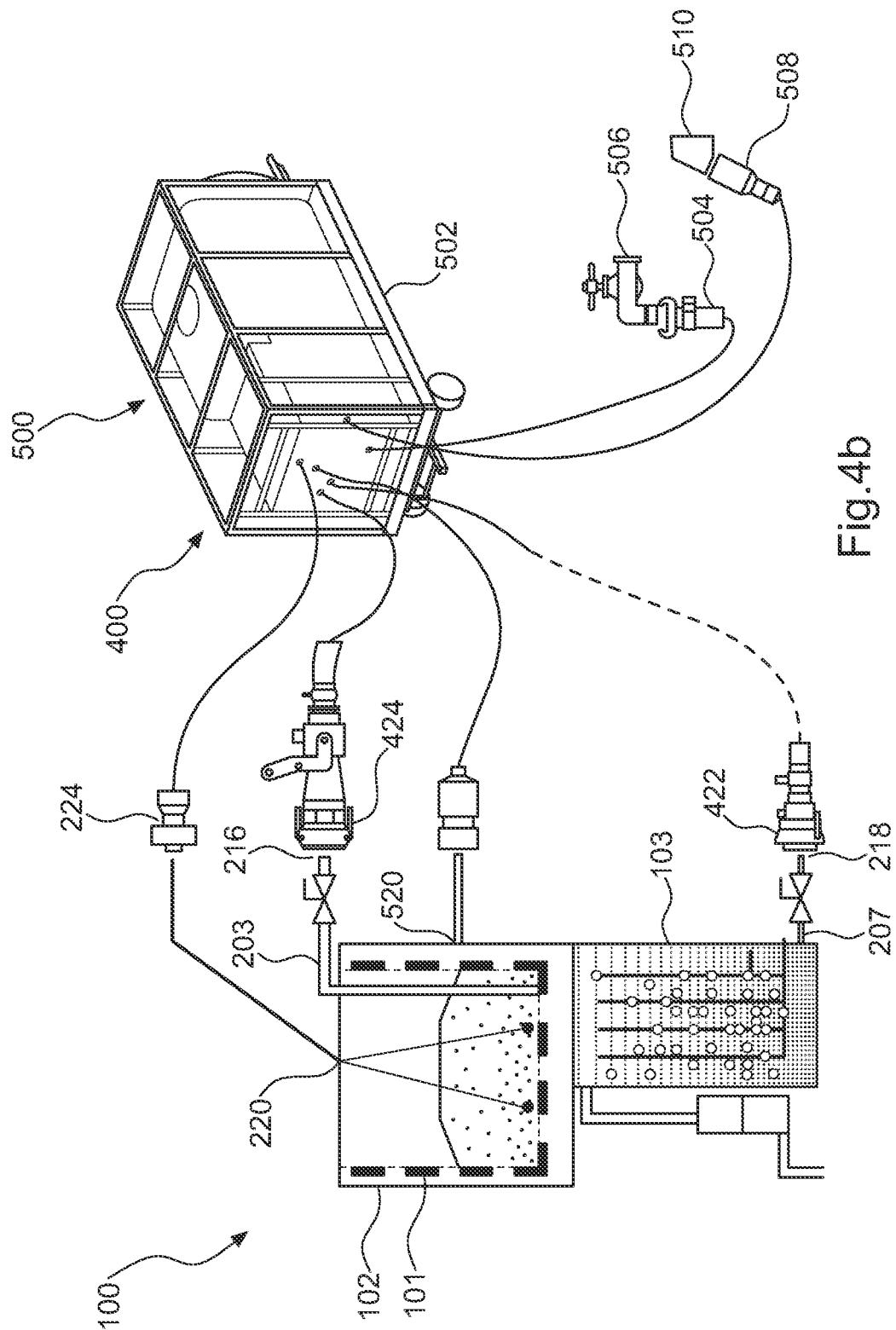
FIG. 4b is a schematic view of a bioreactor cleaning system, which has the permeability test device according to FIG. 4a and is connected to a bioreactor.

FIG. 4a schematically illustrates a permeability test device 400 as connected to the bioreactor 100 according to FIG. 1. FIG. 4b similarly illustrates a mobile bioreactor cleaning system 500, which includes the permeability test device 400 as shown in FIG. 4a, connected to the bioreactor 100.

The permeability test device 400 comprises a suction unit 402 for suctioning residual liquid 208 from the liquid tank 103 through the drain line 207. Further, the permeability test device 400 comprises a liquid metering unit 404 for dispensing a liquid having a predetermined liquid volume V0 into the filter basket 101 through a flushing line 203. Furthermore, the permeability test device 400 comprises a measuring unit 406 in which the extracted filtered liquid volume Vm of the filtered liquid 209 is measured. For controlling the suction unit 402, the liquid metering unit 404 and the measuring unit 406, a control unit 410 is provided, which is in signal communicating connection to these units. Furthermore, according to FIG. 4, a cleaning unit 412 is provided, which, however, does not necessarily have to be part of the permeability test device 400, but can also be provided as a separate structural unit, preferably in the bioreactor cleaning system 500. This is preferred, since in particular the cleaning unit 412 should also be manually operable, independently of the permeability test device 400. However, there may also be embodiments in which the cleaning unit 412 is part of the permeability test device 400.

Specifically, in the schematic embodiment shown in FIG. 4a, the permeability test device 400 includes a valve arrangement 420, shown here only schematically by a block. A plurality of switchable valves may be provided in the valve arrangement 420 to guide the respective fluids. The valve arrangement 420 has a drain line connection 422 through which the permeability test device 400 is connected to the drain line 207, more specifically to the first coupling 218. Further, the valve arrangement 420 comprises a flushing port 424 through which the permeability test device 400 is connected to the flushing line 203, more specifically to the second coupling 216. The first and second couplings 216, 218 are openable so that the permeability test device 400 can be connected to other equipment. In addition, the valve assembly 420 includes a compressed air port 426, a fresh water port 428, and an outlet 430 through which the valve assembly 420 can discharge, for example, aspirated fluid into, for example, a collection tank within the bioreactor cleaning system 500. The compressed air port 426 and the fresh water port 428 are connected internally within the bioreactor cleaning system 500 to corresponding sources not shown herein.

The permeability test device 400 further comprises a pump 432, which is also controllable by the control unit 410. The pump 432 is preferably a rotary pump, which has advantages in discharging the volume of filtered fluid. The pump 432 is connected to a vacuum port 433 of the valve arrangement 420 and provides a vacuum. The valve arrangement 420 and the measuring unit 406 are also in signal communicating connection with the control unit 410. The cleaning unit 412 also has a fresh water connection 434 and is in signal communicating connection with the control unit 410.

As can be seen in particular from FIG. 4b, the permeability test device 400 is integrated into a bioreactor cleaning system 500. The bioreactor cleaning system 500 is designed as a mobile device and is arranged on a carriage stand 502. The bioreactor cleaning system 500 has a fresh water port 504 that can be connected to a fresh water source 506, and a voltage port 508 that can preferably be connected to a high voltage source 510 to provide voltage to the bioreactor cleaning system 500. Internally, the bioreactor cleaning system 500 includes a collection tank for suctioned liquid and a chemical tank for acid, for example.

When a bioreactor 100 is to be cleaned, the bioreactor cleaning system 500 is connected to the bioreactor 100, as shown in FIG. 4b. To first determine a level of the filter cake 104 or a level of the solids tank 102, a level sensor 520 is read. The level sensor 520 can output an 80% value and a 95% value, each indicating the corresponding fill level of the solids tank 102. Then, usually, the filter cake 104 present in the filter basket 101 is first manually rejected via the flushing line 203. Often parts such as paper, feminine hygiene products, partially cutlery, lost objects such as watches, glasses, etc. are found there. All such is first manually extracted and then manually controlled mechanical cleaning is performed by means of the cleaning nozzle 220 to loosen the filter cake 104. The fluid that is then slurried up is also extracted via the suction line 203.

In order to be able to subsequently determine the cleaning success, the method according to the invention is carried out and the permeability is first determined. The exact operation of the permeability test device 400 will now be described with reference to FIGS. 5a-5i, in which further elements of the permeability test device 400, and, in particular, valves of the valve arrangement 420, are also shown in detail.

Figure 5A:
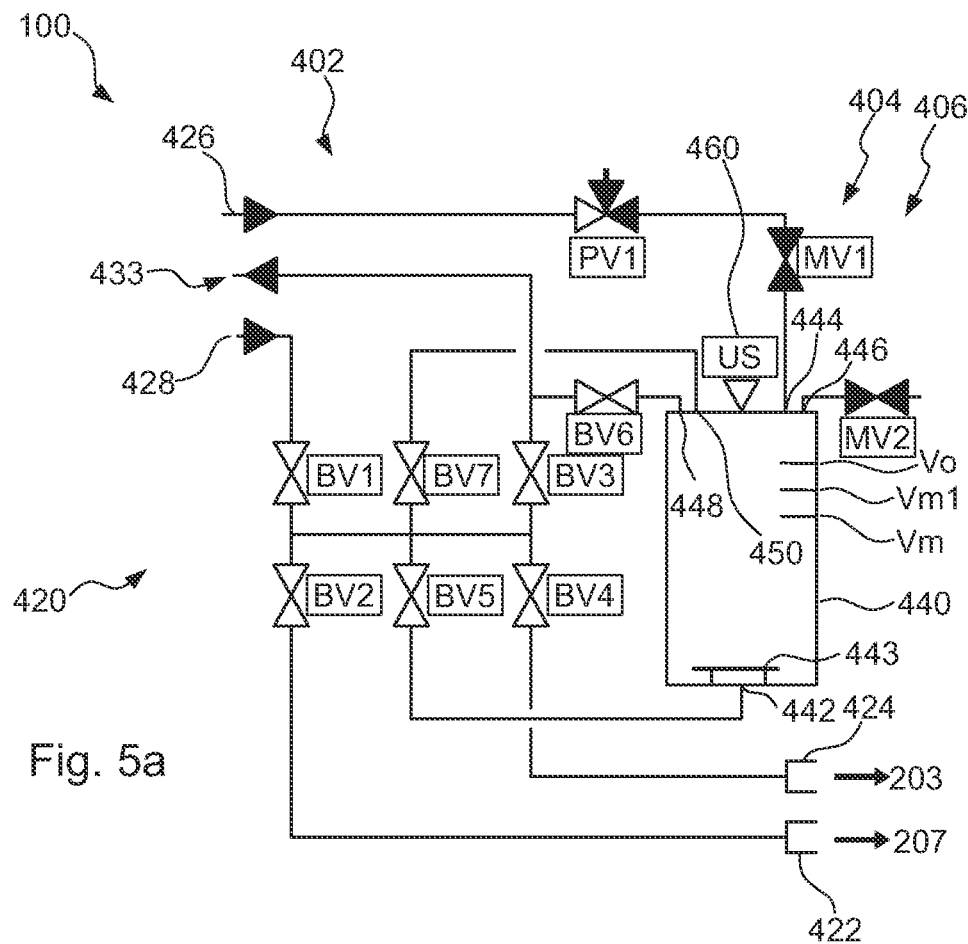
FIGS. 5a-5i are views of a hydraulic circuit diagram of the permeability test device according to FIGS. 4a, 4b.
Figure 5B:
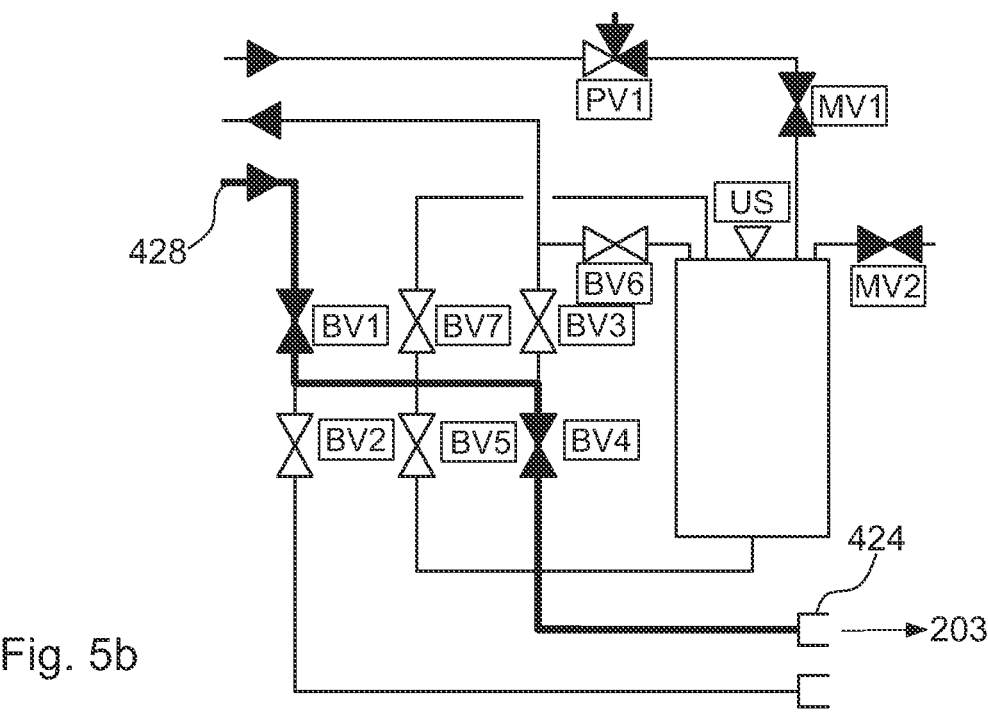
Figure 5C:
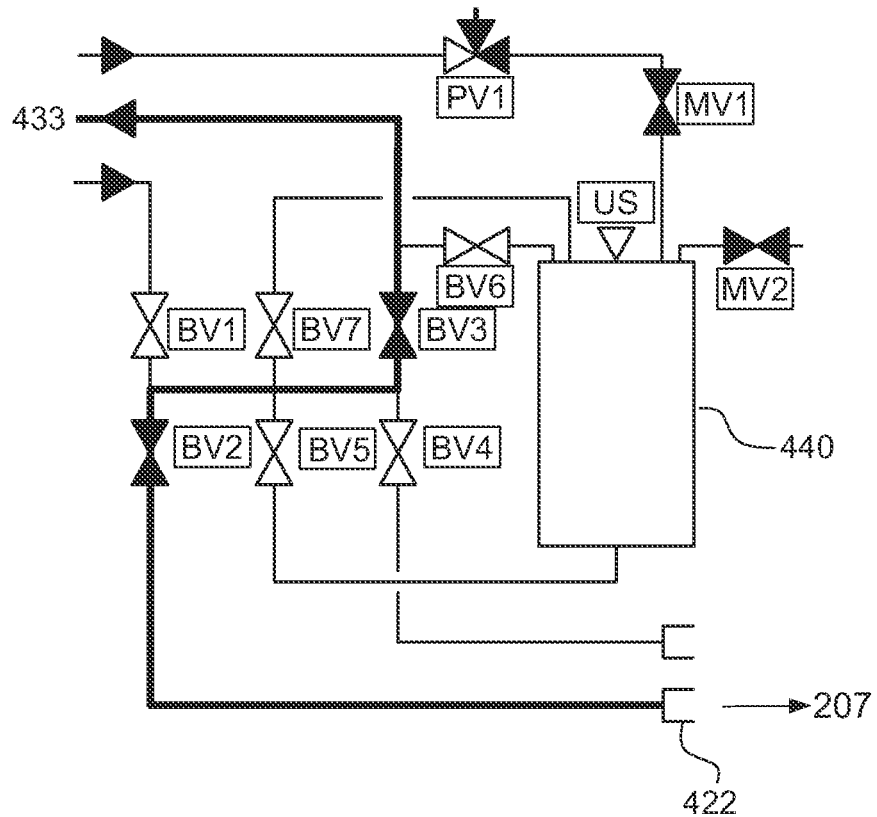
Figure 5D:
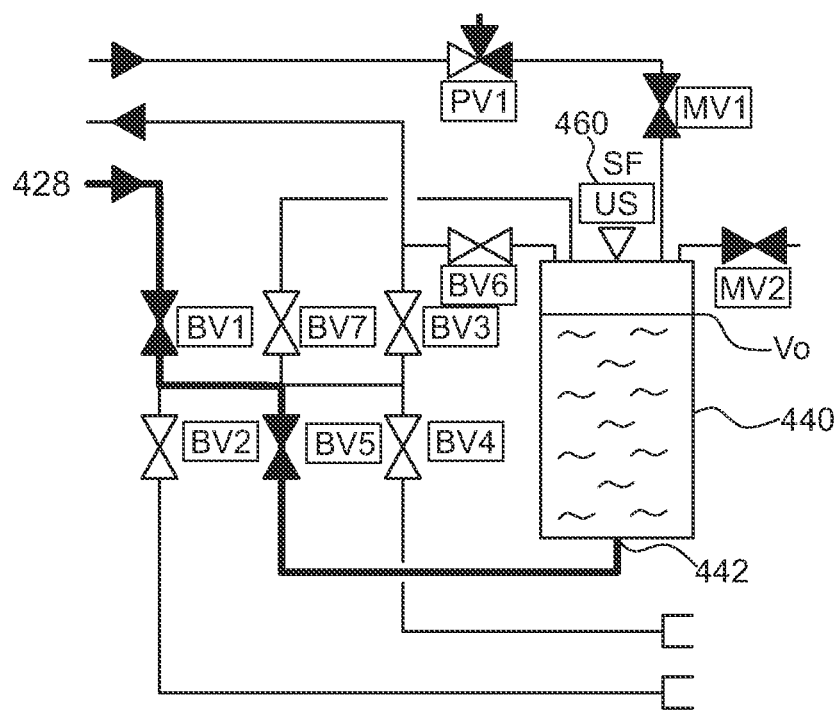

In FIG. 5a, the permeability test device 400 is shown in an initial state. In contrast to FIG. 4b, the control unit 410, the pump 432, and the cleaning unit 412 are not shown, but it should be understood that these elements may be present. Instead of the pump 432, only the vacuum port 433 is shown and all valves and sensors described below are connected to the control unit 410.

Here, the measuring unit 406 includes a measuring cylinder 440, which is also shown previously in FIG. 4a. The measuring cylinder 440 has a lower liquid port 442, a compressed air inlet 444, an air outlet 446, a vacuum port 448, and a measuring liquid inlet 450. The lower liquid port 442 is arranged at the bottom of the vertically oriented measuring cylinder 440, the other ports are arranged at the top. The radial side walls of the measuring cylinder 440 are preferably formed of a transparent material, in particular, glass or acryl. A level sensor, which is here formed as a non-contact distance sensor 460, is further provided on the top side and is also connected to the control unit 410 and provides the first and second measurement signals SM1, SM2 thereto. The distance sensor 460 measures a distance between the same and a liquid surface. For example, the distance sensor 460 is configured as an ultrasonic sensor, a radar sensor, a laser sensor, or a LiDAR sensor. Above the lower fluid port 442, a baffle plate 443 is additionally arranged inside the measuring cylinder 440 to prevent fluid supplied through the lower fluid port 442 from splashing up to the distance sensor 460. In this way, contamination of the distance sensor 460 is to be prevented. At the same time, the compressed air inlet 444 can be used to blow a contaminated distance sensor 460 free. Although the baffle 443 is not shown in the following figures, it should be understood that it is nevertheless present.

Here, the valve arrangement 420 includes a plurality of valves, namely a first valve BV1, a second valve BV2, a third valve BV3, a fourth valve BV4, a fifth valve BV5, a sixth valve BV6, a seventh valve BV7, and a first pneumatic valve PV1, a first throttle MV1, and a balancing valve MV2. The throttle MV1 is arranged in a compressed air line between the compressed air port 426 and the compressed air inlet 444. It can be adjusted manually. Usually, the throttle MV1 is open. The balancing valve MV2 is used to let air out of the measuring cylinder 440 when it is filled with liquid. The balancing valve MV2 is also open during normal operation. All other valves are initially closed, as shown by their unfilled representation of the valves. A fully filled representation of the valves indicates an opened state.

The following FIGS. 5b-5i illustrate various steps of the method 300 for cleaning. In a first step (FIG. 5b), the flushing line 203 is initially filled with water to fill the flushing line 203 so that the subsequently defined volume can be filled into the bioreactor 100 without losses. For this purpose, the first valve BV1 as well as the fourth valve BV4 are opened so that water can enter the flushing line 203 from the fresh water connection 428. Subsequently, the valves BV1 and BV4 are closed again and a predetermined time is waited so that the remaining water can flow through the sintering plate 201. Preferably, a first waiting time is waited here, which is in the range of between 10 and 1000 seconds, preferably 100 to 500 seconds, preferably approximately in the range of 250 seconds. It has been shown that such a time is sufficient to allow residual water present on the sintering plate 201 to flow off. In the following step (FIG. 5c), the suction unit 402 is controlled by means of the electronic control unit 410 to suction residual liquid 208 previously present in the liquid tank 103 or first introduced by the introduction of water as described with reference to FIG. 5b. The suction is performed through the drain line 207, so that now the third valve BV3 as well as the second valve BV2 are opened so that the drain line port 422 is connected to the vacuum port 433. This residual liquid is then simply discharged through the outlet 430.

Subsequently, without a waiting period, the process can proceed with controlling the liquid metering unit 404 by means of the electronic control unit 410 to take up a predetermined liquid V0 into the measuring cylinder 440. The predetermined liquid volume V0 is shown in FIGS. 5a and 4a. For this purpose, the first valve BV1 and the fifth valve BV5 are opened so that fresh water can flow from the fresh water port 428 to the lower liquid port 442 of the measuring cylinder 440 and enter the measuring cylinder 440. At the same time, air that was previously in the measuring cylinder 440 flows out of the measuring cylinder 440 through the outlet valve MV2. Reaching the predetermined liquid volume V0 is preferably determined by means of the distance sensor 460. This provides a corresponding signal SF, which represents a fill level, to the control unit 410, which closes the first valve BV1 and the fifth valve BV5 when the predetermined liquid volume V0 is reached.

This step can now be followed by a waiting period again. However, this is not absolutely necessary. The waiting time here depends largely on whether liquid is ready to be added to the filter basket 101 or not.

Figure 5E:
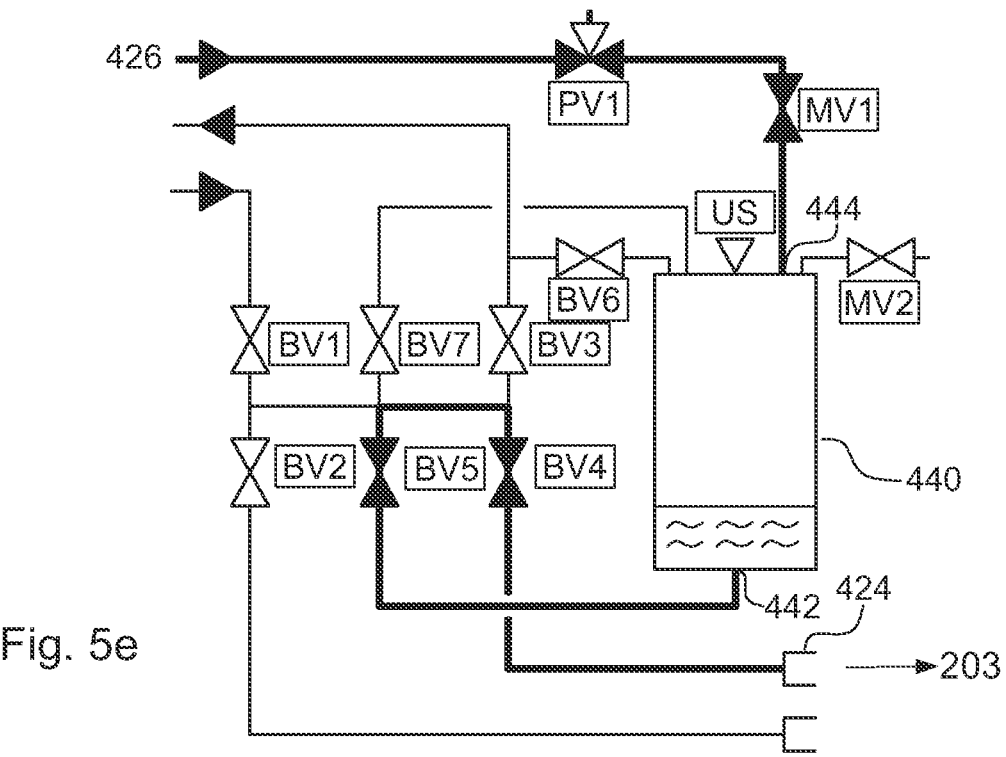
Figure 5F:
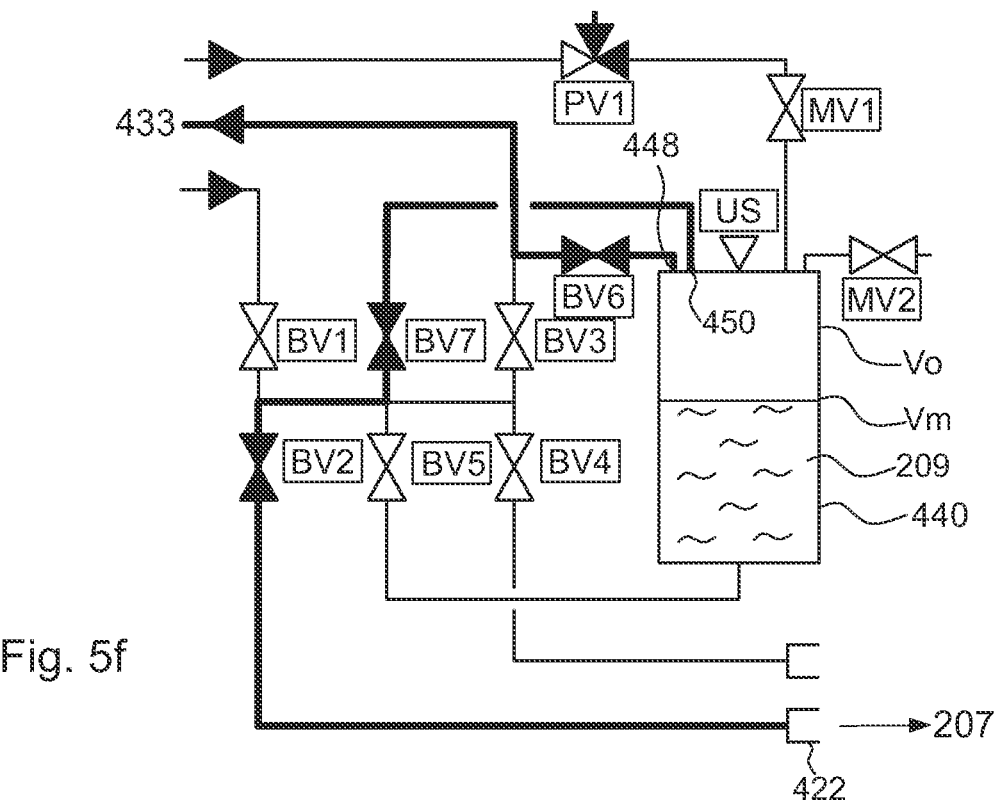

The dispensing of the predetermined liquid volume V0 into the filter basket 101 is illustrated in FIG. 5e. For this purpose, first the balancing valve MV2 is closed, then the valves BV4 and BV5 are opened so that the lower liquid port 442 of the measuring cylinder 440 is connected in a fluid-conducting manner to the flushing port 424 and thus to the flushing line 203. Subsequently, the first pneumatic valve PV1 is opened, so that compressed air can flow into the measuring cylinder 440 via the compressed air inlet 444, thus forcing out the volume V0 of liquid. Here, the throttle MV1 is of relevance. It is important that the liquid is not fed into the filter basket 101 in a gushing manner, but gradually, for example at 5 liters per minute or less, in particular 2.5 liters per minute or less. This is followed again by a waiting time, which may correspond to the first waiting time and may likewise be in the range between 10 and 1000 seconds. The dimensioning of this second waiting time is essentially dependent on how quickly the added liquid flows through the filter basket 101, in particular, through the sintering plate 201. If, for example, a very large area is provided, the waiting time can also be dimensioned to be shorter. In the embodiment example shown, it is preferably 250 seconds. This waiting time corresponds to the duration of the predetermined filter time interval tZ (cf. FIG. 8), which starts from the filter start time (tF). This is when the delivery has been stopped according to FIG. 5e.

Now the sixth valve BV6 is opened so that vacuum can be applied to the vacuum port 448, while the compensation valve MV2 is still closed. At the same time, the second valve BV2 and the seventh valve BV7 are opened so that the measuring fluid inlet 450 is also open. Since there is now negative pressure within the measuring cylinder 440, filtered fluid 209 is drawn into the measuring cylinder 440 via the drain line 207 and the drain line connection via the measuring fluid inlet 450.

Suction can be applied either after a predetermined period of time or depending on whether air is sucked in or not. This has already been described above. For example, suction is applied for a period of about 50 seconds to deliver the filtered liquid to the measuring cylinder 440. Here, this is done in an unthrottled manner.

Figure 5G:
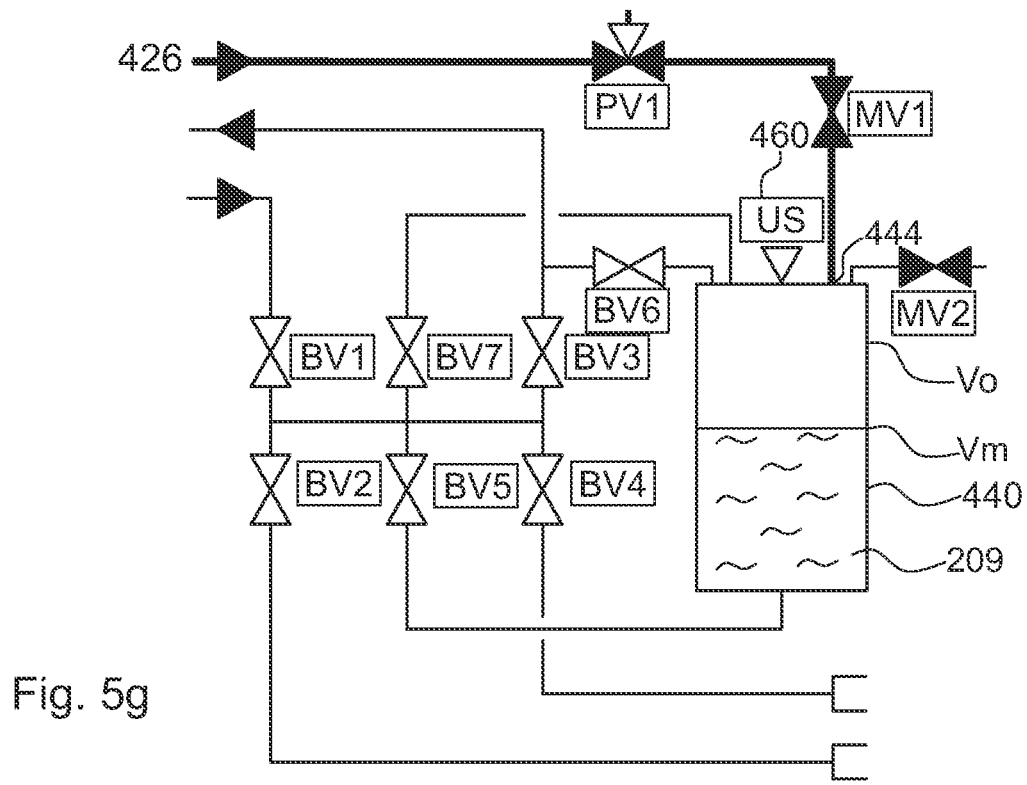

In order to avoid measurement errors, the distance sensor 460 is preferably cleaned in a further step. This is illustrated in FIG. 5g. For this purpose, the second valve BV2, the sixth valve BV6, and the seventh valve BV7 are closed again, but the compensation valve MV2 is opened. At the same time, the first pneumatic valve PV1 is opened for a short period of time so that compressed air can flow into the measuring cylinder 440 via the compressed air port 426 and the compressed air inlet 444, thereby cleaning the distance sensor 460. The distance sensor 460 is used to measure the distance to the surface of the fluid 209 within the measuring cylinder 440. The level Vm is determined and a corresponding signal SM1 is provided to the control unit 410.

The control unit 410 then determines a first permeability quotient QD1 (cf. FIG. 8b) from the volume Vm of the liquid that was suctioned and the volume V0 of the liquid that was added to the filter basket 101. In the shown embodiment, the volume Vm of the liquid that was extracted is lower than the volume V0 of the liquid that was added, which means that liquid still remains on the sintering plate 201 and is, for example, absorbed within the filter cake 104. This indicates a low permeability. That is, the smaller this permeability quotient is, the lower the permeability is. If this permeability quotient QD1 is below a first permeability threshold DG1, which may be 0.8, for example, the cleaning unit 412 is activated. This can be done by means of the control unit 410, even if this is not absolutely necessary. It can also be provided that a further control unit 410 controls the cleaning unit 412.

Figure 5H:
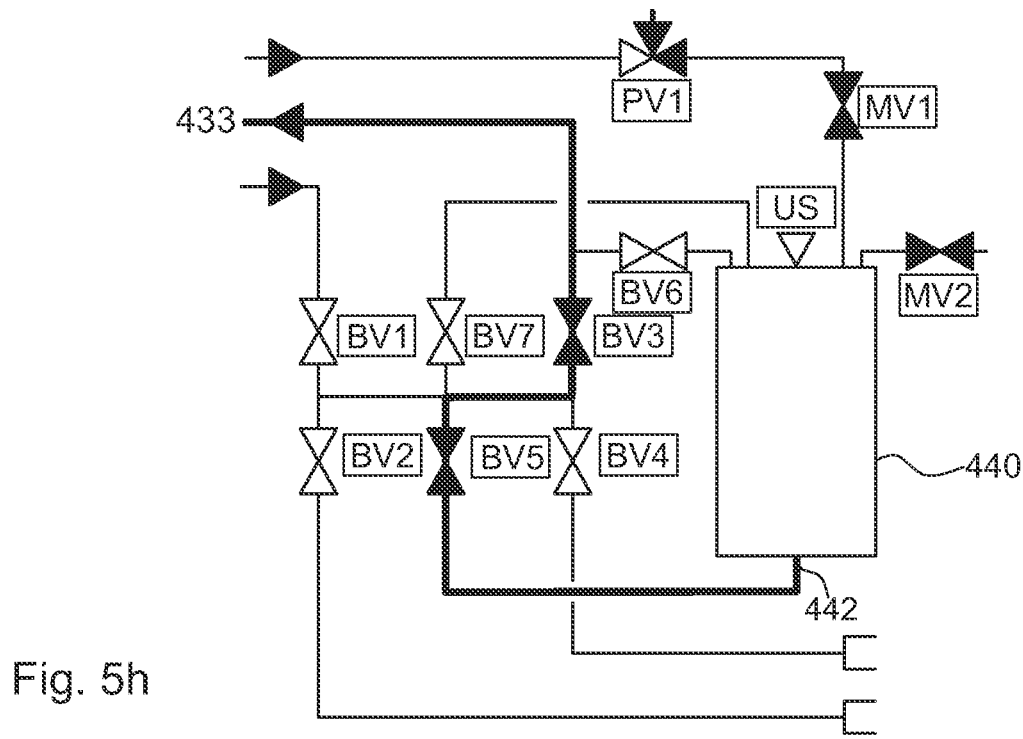
Figure 5I:
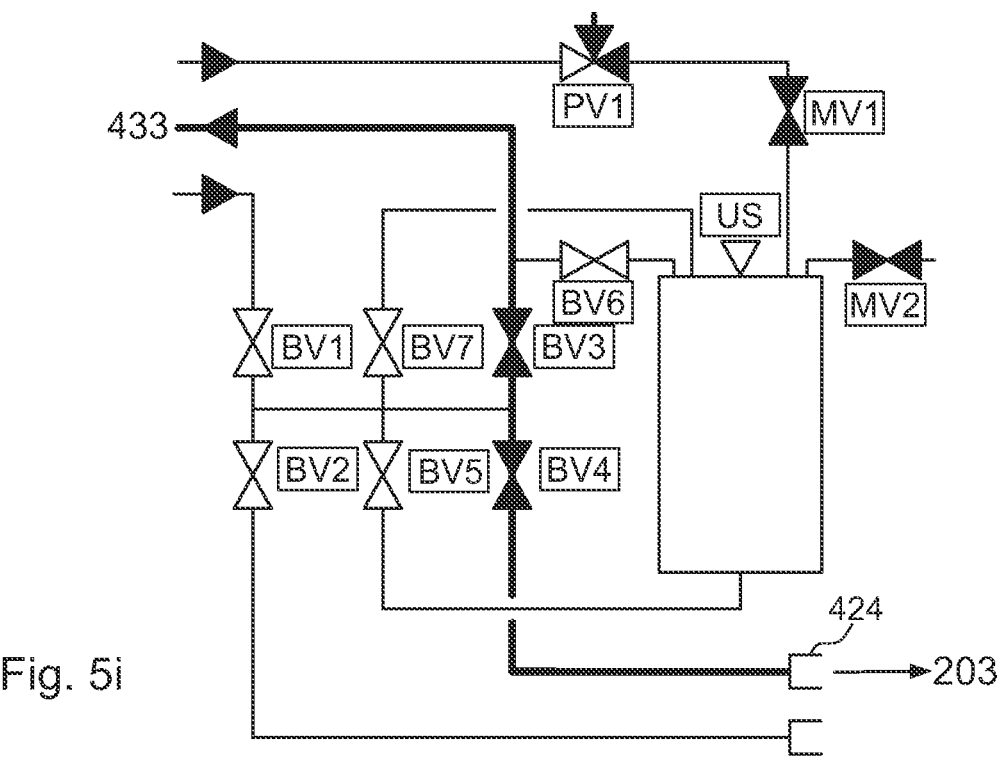

Simultaneously or subsequently, the measuring cylinder 440 must be emptied. This is shown in FIG. 5h. For this purpose, the balancing valve MV2 remains open, while the third valve BV3 and the fifth valve BV5 are also opened. In this way, the lower liquid port 442 is connected to the vacuum port 433 so that the liquid 209 is drawn out. The liquid can in turn be dispensed through the outlet 430. The suction may stop if only air is being drawn in, or if the distance sensor 460 senses that there is no more fluid in the measuring cylinder 440.

In a last step, the flushing line 203 is then drawn empty by connecting the flushing port 424 to the vacuum port 433. For this purpose, the third valve BV3 and the fourth valve BV4 are opened.

Now, when the first cleaning process initiated by means of the cleaning unit 412 has been completed, another permeability test can be carried out. In principle, the same steps are carried out, again preferably using the same predetermined volume V0. However, it may also be provided that only a lower volume or a higher volume than the first predetermined volume V0 is supplied. After the extraction of liquid, a second volume of filtered liquid VM2 is detected, which is usually larger than the first volume VM1 of filtered liquid in the first cycle. There are no further differences in the steps. The waiting times are also preferably identical, but can also be shortened in the second cycle.

Figure 6A:
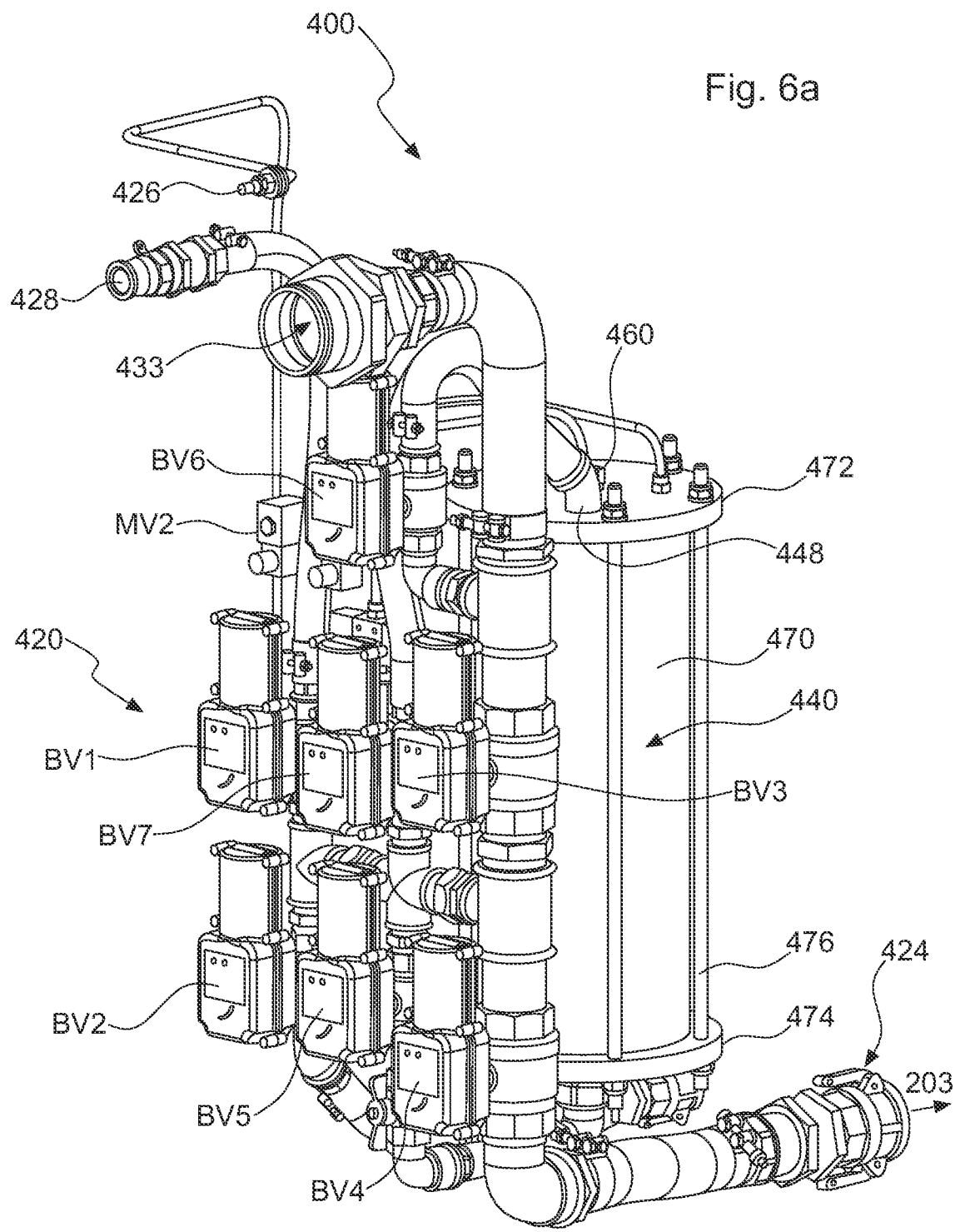
FIGS. 6a and 6b are two views of a permeability test device.
Figure 6B:
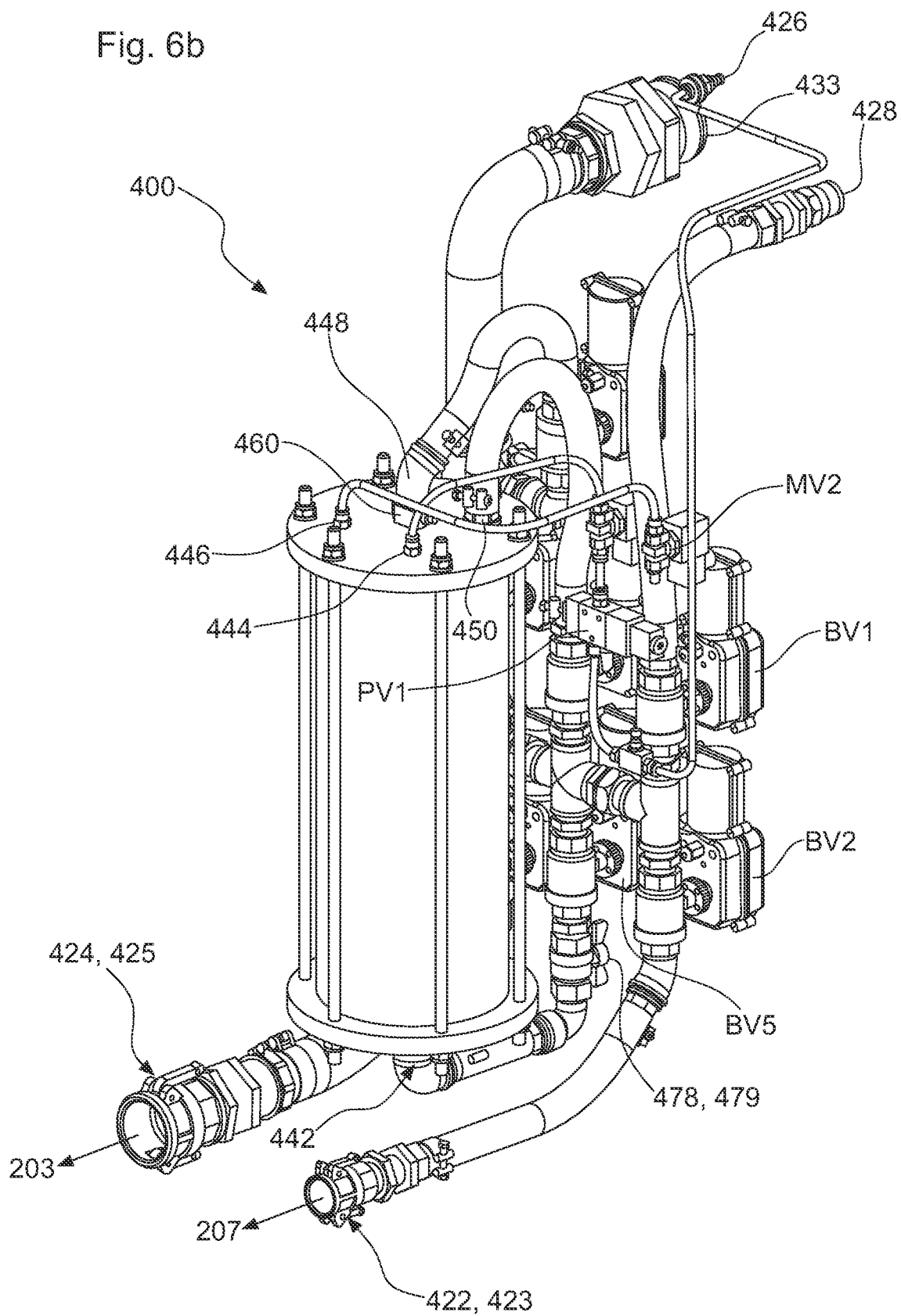

FIGS. 6a and 6b show a first implementation of the permeability test device 400 as described in FIGS. 4 and 5. The permeability test device 400 shown in FIGS. 6a, 6b is intended for expanding existing bioreactor cleaning systems or suctioning systems without a permeability tester. The permeability test device 400 can be integrated into such systems as a retrofit, and vacuum, water and compressed air can be supplied from external sources. Identical and similar elements are designated with the same reference signs as in the previous figures, so that full reference is made to the above description for these elements. Again, in FIGS. 6a and 6b, the control unit 410, the cleaning unit 412, and the pump 432 are not shown. In this respect, the structure of FIGS. 6a, 6b corresponds to that of FIGS. 5a-5i. As can be seen from FIGS. 6a, 6b, the individual valves BV1-BV7, MV1, MV2, and PV1 are connected to each other by means of liquid or compressed air lines, which can carry either air or liquid. The flushing or purge port 424 and the suction line port 422 are each formed as Kamlok couplings 425, 423 so as to be connected to corresponding ports on the bioreactor 100 or a rail-bound vehicle in which the bioreactor 100 is installed.

The measuring cylinder 400 in this embodiment is formed from a cylindrical transparent tubular piece 470, which is closed at its upper and lower front ends by a lid 472 and base 474, respectively. Lid 472 and base 474 are braced against each other by means of clamping screws 476 (only one is provided with a reference sign). In the cover 472, the connections 448, 450, 444, 446, as well as the distance sensor 460 are arranged and fastened. In the bottom 474, the lower liquid connection 442 is provided.

In FIG. 6b, it can additionally be seen that a ball valve 478 is installed in a line between the fresh water inlet 442 and the fifth valve BV5 as a restrictor 479. It has been found that extracted residual liquid, fresh water as well as any liquid introduced into the measuring cylinder 440 via the lower liquid port 442 should not be introduced at an excessive pressure in order to avoid contamination of the distance sensor 460. In principle, it is also preferred to design the throttle 479 to be electronically controllable. In the embodiment shown, however, it is purely mechanical and can be set manually by an operator.

Figure 7:
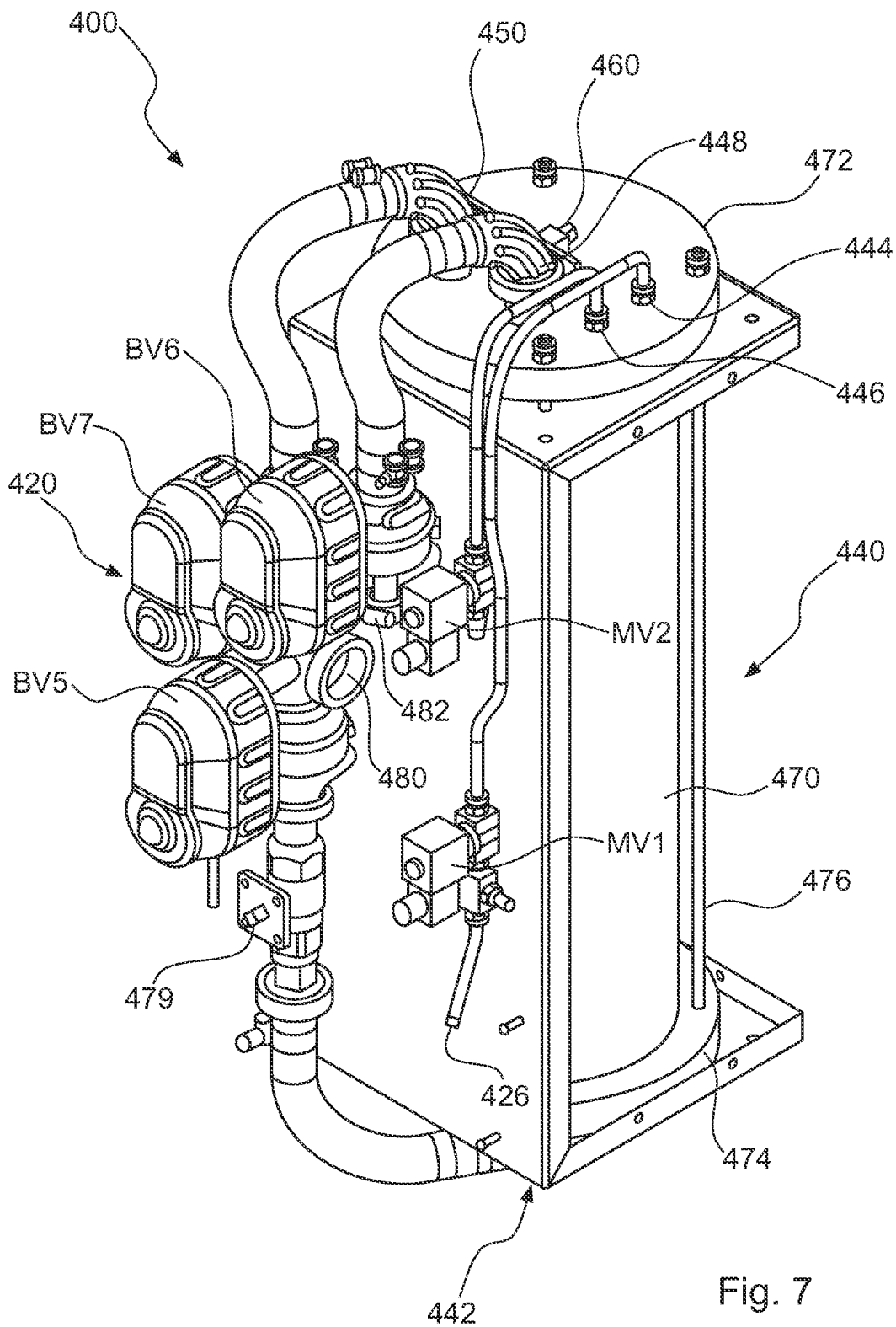
FIG. 7 is a view of a further permeability test device.

FIG. 7 shows a second practical implementation of the permeability test device 400, which is particularly suitable for installation in the bioreactor cleaning system 500 shown in FIG. 4b with a higher degree of automation. For this reason, in particular, the valve arrangement 420 has a different design than in the previous embodiment (FIGS. 6a, 6b), as well as the connections. Identical and similar elements are again indicated with the same reference signs, so that full reference is made to the above description for these.

As can be seen in particular from FIG. 7, only the fifth valve BV5, the sixth valve BV6, and the seventh valve BV7 are present here. In already existing bioreactors with a manual permeability test device, the remaining valves are usually present or replaced, so that the inclusion of these three valves BV5, BV6, BV7 is sufficient here. A liquid connection 480 is provided between valves BV5 and BV7, to which the lines branching off between valves BV1 and BV2 or BV3 and BV4 (cf. FIG. 5a) can be connected. That is, a T-piece or manifold should first be connected to the liquid port 480 in order to then connect the corresponding lines. Accordingly, the liquid port 480 receives both, fresh water and liquid, from the bioreactor and forwards it to either the lower liquid port 442 or the liquid inlet 450 according to the circuit of the valves BV5, BV7. Valve BV6 is provided with a vacuum port 482, which may be connected in a corresponding manner to the conduit connecting vacuum port 433 and third valve BV3 as shown in FIG. 5a.

Figure 8A:
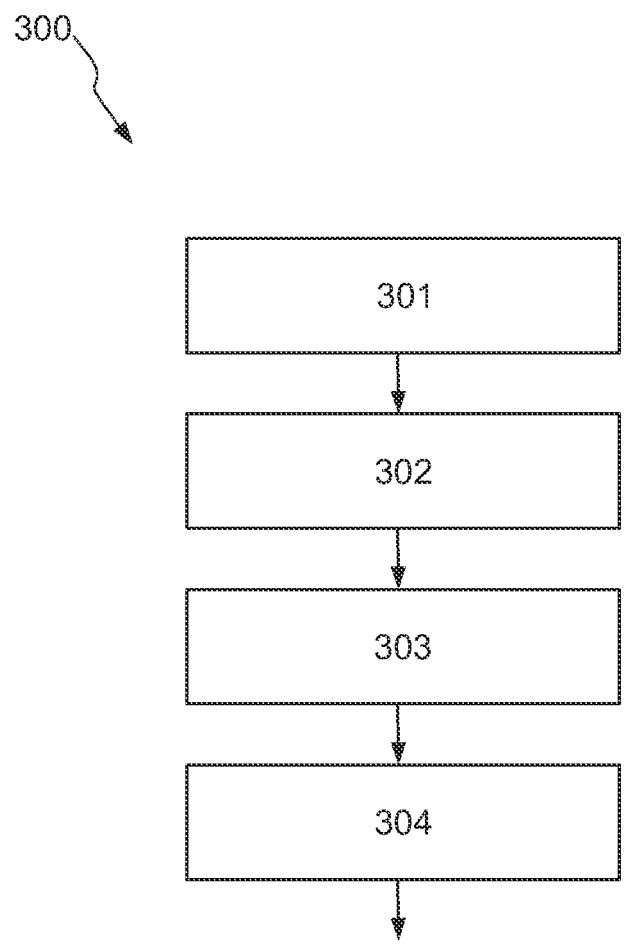
FIGS. 8a-8c are a schematic sequence of steps in a process for automated cleaning of a filter basket in a bioreactor.

Finally, FIG. 8a illustrates the method 300 for automated cleaning of the filter basket 101 in a bioreactor 100, comprising initially a step of determining 301 a permeability of the filter basket 101 and, after this, controlling 302 a cleaning unit 412 as described in principle above to perform a cleaning process of the filter basket 101 if certain criteria are met. This may be followed by a second determination 303 of the permeability of the filter basket 101, which may be performed in an identical or similar way to the first determination 301. The second determination 303 is preferably followed in turn by controlling 304 of the cleaning unit 412. This sequence of steps is preferably carried out until a desired cleaning result has been achieved. Cleaning steps may also have been carried out prior to step 301. It is not mandatory that a permeability is first determined and only then a cleaning step is carried out. It is also within the scope that a cleaning step is carried out first and only then is the permeability determined.

Figure 8B:
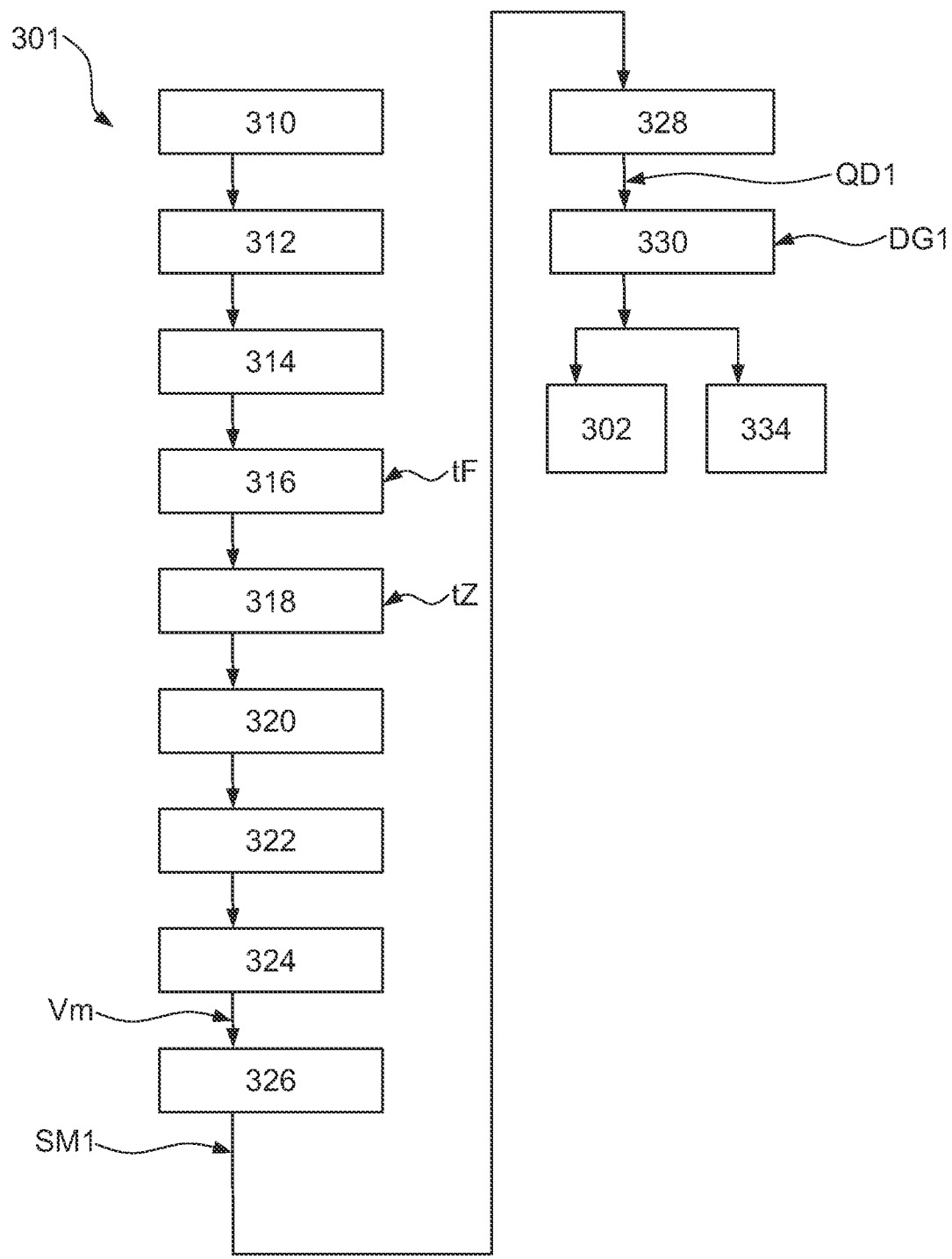
Figure 8C:
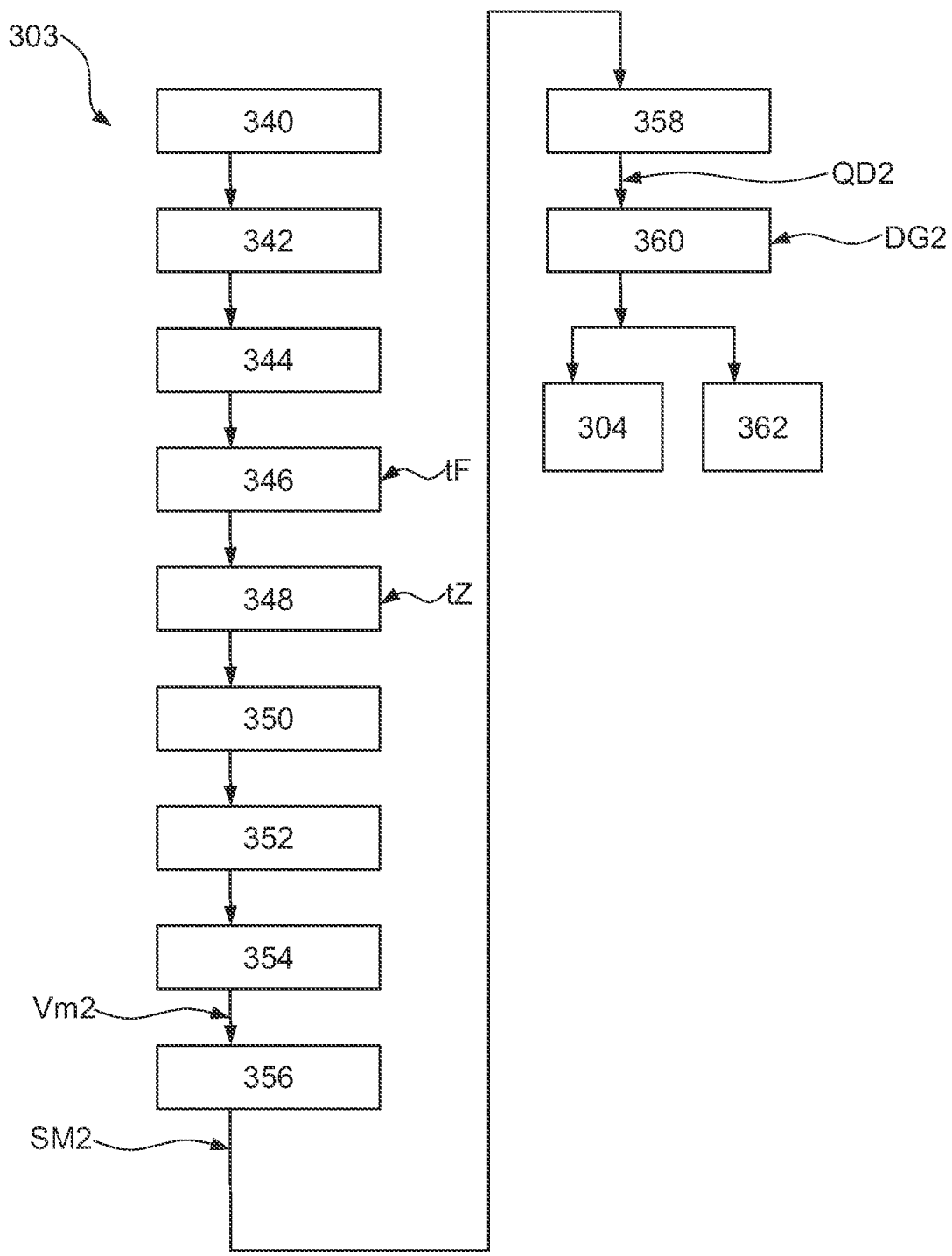

FIG. 8b illustrates step 301 in detail. In an embodiment, step 301 (determining the permeability of the filter basket 101) comprises, in a first step, controlling 310 the suction unit 102 by means of the electronic control unit 410 to suck the residual liquid 208 out of the liquid tank 103. Subsequently, as described with reference to FIGS. 5a-5i, the predetermined volume of liquid is first received in the measuring cylinder 440. This is done in step 312. Then, in step 314, the liquid metering unit 404 is controlled to dispense the predetermined volume of liquid V0 into the filter basket 101. Here, it should be understood that step 312 is not mandatory. It may also be provided that the predetermined volume of liquid V0 is dispensed directly into the filter basket 101, without prior measuring in the measuring cylinder 440. Subsequently, in step 316, dispensing of the liquid is terminated. This is done at a filter start time tF. It is important in the step 314 that the liquid is not dispensed into the filter basket 101 too quickly, but at a dispensing rate as described above. When the filter start time tF is determined, by stopping the dispensing of the liquid, in step 318, a predetermined filtering time interval tZ is first waited for to give the liquid that has been dispensed into the filter basket 101 time to pass through the filter cake 104. Subsequently, in step 320, the suction unit 402 is controlled in order to empty the liquid tank 103. The liquid tank 103 contains the filtered liquid volume 209 that has passed through the filter basket 101 and collected in the liquid tank 103. In step 322, this extracted filtered liquid volume 209 is received in the measuring cylinder 440. Then, in step 324, the volume VM of the extracted filtered liquid volume 209 is measured. After measurement, a corresponding first measurement signal SM1 representing the first measurement result is sent (step 326) to the control unit 410, which then determines a first permeability quotient QD1 from the volume Vm previously measured and the volume V0 initially added to the filter basket 101 in step 328. Then, the control unit 410 compares the first permeability quotient QD1 with a first predetermined permeability limit DG1. Subsequently, a comparing step is performed: If the first permeability quotient QD1 is below the first permeability threshold DG1, the cleaning unit is activated 332. However, if the first permeability quotient is above or corresponds to the first permeability threshold DG1, the process is preferably terminated. At the same time, it can be provided that a signal is output in step 334 indicating that the desired cleaning result has been achieved. Cleaning then does not have to be carried out any further.

Depending on how far the first permeability quotient QD1 is below the first permeability threshold DG1, a distinction can also be made between mechanical or chemical cleaning. These are then further sub-steps of step 302. If the first permeability quotient QD1 is below the first permeability threshold DG1 by a first amount, a chemical cleaning process is preferably carried out. However, if the first permeability quotient QD1 is below the first permeability threshold DG1 by a second amount, a mechanical cleaning process is performed. How the first and second amounts are selected is preferably specified by the manufacturer or by the operator of the bioreactor 100. The exact amounts of these values depend on the type of bioreactor 100, the type of filter basket 101, and other parameters that are not the subject of the invention here.

The first cleaning process in step 302 may be followed by a second determination of permeability 303, as described with reference to FIG. 8a. The second determination of permeability 303 is now described in detail with reference to FIG. 8c.

In a step 340, the extraction unit 402 is controlled by means of the electronic control unit 410 to extract the residual liquid 208 present in the liquid tank 103. This is analogous to step 310 and may be performed identically. In particular, the suctioning in step 340 may be performed identically to the suctioning in step 310. In step 342, a predetermined volume of liquid V0 is taken into the measuring cylinder 440. The predetermined volume of fluid V0 taken up here in step 342 may correspond to the predetermined volume of fluid V0 taken up in step 312. However, a different predetermined fluid volume V0 may be used in each case. In step 344, the liquid metering unit 404 is then controlled by means of the electronic control unit 410 to dispense the predetermined volume of liquid V0 into the filter basket 101. This can be carried out identically to step 314, in particular, at the same dispensing rate. Alternatively, however, a different dispensing rate may be used. In step 346, dispensing is terminated, again at a filter start time tF. Subsequently, in step 348, waiting is performed for a predetermined filter time interval tZ. The filter time interval tZ in step 348 may be a second filter time interval different from the first filter time interval tZ in step 318. Preferably, however, the filter time intervals tZ are selected to be identical.

Subsequently, after the filter time interval tZ has elapsed, the suction unit 402 is controlled by means of the control unit 410 (step 350) in order to suction the filtered liquid volume 209 from the liquid tank 103. The suction may again be performed for the same period of time as was done in step 320. In step 352, the aspirated volume of liquid is again received in the measuring cylinder 440. In step 354, the volume Vm2 taken up is measured. The volume Vm2 taken in the second cycle is usually slightly larger than the volume Vm taken in the first cycle, since the filter basket has been cleaned in the meantime in step 302. In step 356, a second measurement signal SM2 is sent to the control unit 410 representing a second measurement result. In step 358, a second permeability quotient QD2 is determined by the control unit. For this purpose, the control unit 410 uses the volume Vm2 of the previously extracted filtered liquid volume to the volume V0 added to the filter basket in step 344. In step 360, the second permeability quotient QD2 is compared with a second predetermined permeability threshold DG2. Subsequently, a comparison again takes place. If it is determined that the second permeability quotient QD2 is below the second permeability threshold DG2, the cleaning process is carried out in step 304 (cf. FIG. 8a) as described above. Otherwise, a signal may again be output in step 362 indicating that the desired cleaning result has been achieved. In cleaning step 304, a distinction can again be made between mechanical and chemical cleaning.

The invention claimed is:

1. A method for automated cleaning of a filter basket in a bioreactor, wherein the filter basket is in fluid communication with a liquid tank on the outlet side, and wherein the filter basket is defined by filtering walls on a bottom side and on lateral sides, the method comprising the steps of:
   determining a permeability of the filter basket, further comprising the steps of:
      a. controlling a suction unit by means of an electronic control unit to suction a residual liquid from the liquid tank through a drain line,
      b. subsequently controlling a liquid metering unit by means of the electronic control unit to dispense a liquid having a predetermined liquid volume into the filter basket through a flushing line,
      c. terminating dispensing of the fluid at a filter start time,
      d. controlling, after a duration of a predetermined filter time interval, which starts at the filter start time, has elapsed, the suction unit by means of the control unit to empty the liquid tank by suctioning a filtered liquid volume from the liquid tank through the drain line,
      e. measuring the volume of the filtered liquid suctioned in step (d) in a measuring unit and sending a first measurement signal representing a first measurement result from the measuring unit to the control unit,
      f. determining a first permeability quotient from the volume of the filtered liquid suctioned in step (d) to the volume of the predetermined liquid volume dispensed in step (b) in the control unit, and
      g. comparing the first permeability quotient with a first predetermined permeability threshold by the control unit; and
   controlling a cleaning unit to perform a cleaning process of the filter basket if the first permeability quotient is below the first permeability threshold.

2. The method according to claim 1, wherein, after completion of the cleaning process, a second determination of the permeability of the filter basket is performed, further comprising the steps of:
   h. controlling the suction unit by means of the electronic control unit to suction a residual liquid from the liquid tank through the drain line, i. controlling the liquid metering unit by means of the electronic control unit to dispense a liquid having a predetermined liquid volume into the filter basket through the flushing line,
j. terminating dispensing of the fluid at a filter start time,
k. controlling, after a duration of a predetermined filter time interval, which starts from the filter start time, has elapsed, the suction unit by means of the control unit to empty the liquid tank by suctioning a filtered liquid volume from the liquid tank through the drain line,
l. measuring the volume of the filtered liquid volume of the filtered liquid suctioned in step (k) in the measuring unit and sending a second measurement signal representing a second measurement result from the measuring unit to the control unit,
m. determining a second permeability quotient from the volume of the filtered liquid volume suctioned in step (k) to the volume of the predetermined volume of liquid dispensed in step (i) in the control unit, and
n. comparing the second permeability quotient determined in step (m) with a second predetermined permeability threshold by the control unit, wherein the second permeability threshold:
corresponds to the first predetermined permeability threshold, or
is greater than the first predetermined permeability limit; and
controlling the cleaning unit to perform the cleaning process of the filter basket if the second permeability quotient formed in step (m) is below the second permeability threshold.

3. The method according to claim 2, wherein the cleaning unit:
performs a mechanical second cleaning process if the second permeability quotient determined in step (m) is below a second cleaning threshold which is lower than the second permeability threshold and higher than the first cleaning threshold; and
performs a chemical second cleaning process if the second permeability quotient is above the second cleaning threshold but is lower than the second permeability threshold.

4. The method according to claim 2, wherein the liquid metering unit in step (i) is controlled by means of the electronic control unit in such a way that the dispensing of the liquid with the predetermined liquid volume takes place with a dispensing rate which is the quotient of the volume measured in step (e) to the predetermined filter time interval according to step (d) is not exceeded.

5. The method according to claim 1, wherein:
the cleaning process is a mechanical cleaning process if the first permeability quotient determined in step (f) is below a first cleaning threshold which is lower than the first permeability threshold; and
the cleaning process is a chemical cleaning process if the first permeability quotient determined in step (f) is above the first cleaning threshold but is lower than the first permeability threshold.

6. The method according to claim 1, wherein the bottom side of the filter basket has a total bottom area size and the dispensed predetermined liquid volume is metered according to the product of the total bottom area size and a filling height of 0.25 cm to 2.5 cm in the filter basket.

7. The method according to claim 1, wherein the liquid metering unit in step (b) is controlled by means of the electronic control unit in such a way that the dispensing of the liquid with the predetermined liquid volume takes place at a dispensing rate of 5 liters per minute or less.

8. The method according to claim 1, wherein during the suctioning in step (a), (d), (h), and/or (k), the step(s) is monitored by means of a suction detection unit whether liquid or air is being suctioned.

9. The method according to claim 1, wherein between step (a) and (b) the flushing line, via which the predetermined liquid volume is metered, is completely filled with liquid.

10. The method according to claim 1, wherein the suction unit in step (a) is controlled for a duration of a predetermined first suction period, and the suction unit is controlled in step (d) for the duration of the predetermined first suction period.

11. The method according to claim 1, wherein the suction unit in step (a) is continued to be controlled for a duration of a predetermined first suction period from the time at which no more pure liquid but a liquid-air mixture is suctioned, and in that the suction unit in step (e) is continued to be controlled for the duration of the predetermined first suction period from the time at which no more pure liquid but a liquid-air mixture is suctioned.

12. The method according to claim 1, wherein the liquid metering unit comprises a measuring cylinder, and the method further comprises the step of:
receiving the predetermined volume of liquid in the measuring cylinder, before the predetermined liquid volume is dispensed into the filter basket.

13. The method according to claim 12, comprising the step of collecting the suctioned filtered liquid volume in the measuring cylinder, before measuring the volume of the suctioned filtered liquid volume.

14. The method of claim 13, wherein for receiving the suctioned filtered liquid volume, a vacuum is applied to the measuring cylinder to suction the filtered liquid volume and thus receive it in the measuring cylinder.

15. The method according to claim 13, wherein the measuring cylinder comprises a non-contact distance sensor for detecting a level in the measuring cylinder and the measuring of the volume of the suctioned filtered liquid volume is performed by means of the non-contact distance sensor.

16. A permeability test device for automated cleaning of a filter basket in a bioreactor, wherein the filter basket is in fluid communication with a liquid tank on the outlet side and is defined by filtering walls on the bottom side and on lateral sides, the permeability test device comprising:
an electronic control unit in signal communication with a suction unit, a liquid metering unit, a measuring unit, and a cleaning unit, wherein the suction unit is in fluid connection with the measuring unit, and the control unit is adapted to control the suction unit, the liquid metering unit and the measuring unit for determining a permeability of the filter basket, and wherein the control unit is configured to:
a. control the suction unit to suction a residual liquid from the liquid tank through a drain line,
b. subsequently control the liquid metering unit to dispense a liquid having a predetermined liquid volume into the filter basket through a flushing line,
c. terminate dispensing the liquid at a filter start time,
d. control, after a duration of a predetermined filter time interval, which starts from the filter start time, has elapsed, the suction unit to empty the liquid tank by suctioning a filtered liquid volume from the liquid tank through the drain line,
e. measure the volume of the filtered liquid suctioned in step (d) in a measuring unit and receiving a first measurement signal representing a first measurement result from the measuring unit, f. determine a first permeability quotient from the volume of the filtered liquid volume suctioned in step (d) to the volume of the predetermined liquid volume dispensed in step (b) in the control unit, and g. compare the first permeability quotient with a first predetermined permeability threshold by the control unit; and wherein the control unit is configured to control the cleaning unit to perform a first cleaning process of the filter basket if the first permeability quotient determined in step (f) is below the first permeability threshold.

17. The permeability test device according to claim 16, wherein the control unit is adapted to control the suction unit, the liquid metering unit and the measuring unit for a second determination of the permeability of the filter basket after completion of the first cleaning process of the filter basket, wherein the control unit is configured to:

h. control the suction unit to suction a residual liquid from the liquid tank through the drain line, i. control the liquid metering unit to dispense a liquid having a predetermined liquid volume into the filter basket through the flushing line, j. terminate dispensing of the liquid at a filter start time, k. control, after a duration of a predetermined filter time interval, which starts from the filter start time, has elapsed, the suction unit by means of the control unit to empty the liquid tank by suctioning a filtered liquid volume from the liquid tank through the drain line, l. measure the volume of the filtered liquid volume of the filtered liquid suctioned in step (k) in a measuring unit and receive a second measurement signal representing a second measurement result from the measuring unit in the control unit, m. determine a second permeability ratio from the volume of the filtered liquid volume extracted in step (k) extracted filtered liquid volume to the volume of the predetermined liquid volume dispensed in step (i) in the control unit, n. compare the second permeability quotient determined in step (m) with a second predetermined permeability threshold by the control unit, wherein the second permeability threshold:

corresponds to the first predetermined permeability threshold, or is above the first predetermined permeability threshold; and wherein the control unit is configured to control the cleaning unit to perform a second cleaning process of the filter basket after the second determination of a permeability of the filter basket, if the permeability quotient determined in step (m) is below the second predetermined permeability threshold.

18. The permeability test device according to claim 17, wherein:

the control unit is adapted to control the cleaning unit after the second determination of a permeability of the filter basket for performing a mechanical second cleaning process if the second permeability quotient formed in step (m) is below a second cleaning threshold which is smaller than the second permeability threshold and larger than the first cleaning threshold; and the control unit is adapted to control the cleaning unit to perform a chemical second cleaning process if the second permeability quotient determined in step (m) is above the second cleaning threshold but is lower than the second permeability threshold.

19. The permeability test device according to claim 16, further comprising a drain line port connecting the permeability test device to the drain line and a flushing port connecting the permeability test device to the flushing line.

20. The permeability test device according to claim 16, further comprising a fresh water port supplying fresh water to the permeability test device and a compressed air port supplying compressed air to the permeability test device.

21. The permeability test device according to claim 16, wherein:

the control unit is adapted to control the cleaning unit after determining the permeability of the filter basket to perform a mechanical cleaning process if the first permeability quotient determined in step (f) is below a first cleaning threshold which is lower than the first permeability threshold; and the control unit is adapted to control the cleaning unit to perform a chemical cleaning process if the first permeability quotient determined in step (f) is above the first cleaning threshold but is lower than the first permeability threshold.

22. The permeability test device according to claim 16, comprising a turbidity sensor and/or a conductivity sensor downstream of the drain line connected to the control unit for providing to the control unit a turbidity signal representing a turbidity of the suctioned liquid and/or a conductivity signal representing a conductivity of the suctioned liquid.

23. The permeability test device according to claim 16, wherein the liquid metering unit comprises a measuring cylinder into which the predetermined volume of liquid is received.

24. The permeability test device according to claim 23, wherein the extracted filtered liquid volume is receivable in the measuring cylinder.

25. The permeability test device of claim 23, wherein the measuring cylinder is connected to the suction unit to apply a vacuum thereto.

26. The permeability test device according to claim 23, wherein the measuring cylinder comprises a non-contact distance sensor for detecting a fill level in the measuring cylinder.

* * * * *